(12) United States Patent
Coolidge

(10) Patent No.: US 9,027,589 B2
(45) Date of Patent: May 12, 2015

(54) HYDRAULIC VALVE WITH PRESSURE LIMITER

(75) Inventor: Gregory Coolidge, Elyria, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 262 days.

(21) Appl. No.: 13/635,644

(22) PCT Filed: Nov. 22, 2010

(86) PCT No.: PCT/US2010/057555
§ 371 (c)(1),
(2), (4) Date: Nov. 27, 2012

(87) PCT Pub. No.: WO2011/115647
PCT Pub. Date: Sep. 22, 2011

(65) Prior Publication Data
US 2013/0061955 A1    Mar. 14, 2013

Related U.S. Application Data

(60) Provisional application No. 61/314,620, filed on Mar. 17, 2010.

(51) Int. Cl.
*F16K 31/12* (2006.01)
*G05D 16/10* (2006.01)
(Continued)

(52) U.S. Cl.
CPC .............. *G05D 16/10* (2013.01); *F15B 13/026* (2013.01); *F15B 13/0417* (2013.01); *F15B 2211/3054* (2013.01); *F15B 2211/40569* (2013.01);
(Continued)

(58) Field of Classification Search
USPC .............................. 137/488, 490; 91/446, 447
See application file for complete search history.

(56) References Cited

U.S. PATENT DOCUMENTS 5,305,789 A * 4/1994 Rivolier ........................ 137/596
5,752,384 A   5/1998 Schmitt et al.
(Continued)

FOREIGN PATENT DOCUMENTS

DE    19831595    1/2000
EP    0624732    11/1994

OTHER PUBLICATIONS

International Search Report and the Written Opinion of the International Searching Authority for the corresponding patent application No. PCT/US2010/057555 dated Nov. 22, 2010.

(Continued)

*Primary Examiner* — Craig Schneider
*Assistant Examiner* — R. K. Arundale
(74) *Attorney, Agent, or Firm* — Renner, Otto, Boisselle & Sklar, LLP

(57) ABSTRACT

An assembly of valve sections includes an inlet section, an outlet section, a working section, and a working section. The working section is a conventional pressure compensated working section. The working section includes a directional control valve, a pressure compensator valve, and a pressure limiter valve. The valves are of integral construction, such that each is an essential part to complete the other. The pressure compensator valve includes a pressure compensator spool movable between an opened position and a closed position in response to a pressure differential across the spool. The pressure limiter valve includes a pressure limiter spool that moves to an open position to change the pressure differential and close the pressure compensator valve when a selected limit pressure is reached.

21 Claims, 17 Drawing Sheets

(51) Int. Cl.
*F15B 13/02* (2006.01)
*F15B 13/04* (2006.01)

(52) U.S. Cl.
CPC .................. *F15B2211/50554* (2013.01); *F15B 2211/5153* (2013.01); *F15B 2211/55* (2013.01); *F15B 2211/653* (2013.01)

(56) References Cited

U.S. PATENT DOCUMENTS

| | | | |
|---|---|---|---|
| 5,791,142 | A | 8/1998 | Layne et al. |
| 6,098,403 | A | 8/2000 | Wilke |
| 6,895,852 | B2 | 5/2005 | Pieper |
| 7,182,097 | B2 | 2/2007 | Busani |
| 7,628,174 | B2 | 12/2009 | Kauss et al. |
| 8,100,145 | B2 * | 1/2012 | Desbois-Renaudin .. 137/625.69 |
| 2003/0205128 | A1 | 11/2003 | Zenker et al. |
| 2008/0224073 | A1 | 9/2008 | Christensen et al. |
| 2009/0266070 | A1 | 10/2009 | Pack et al. |

OTHER PUBLICATIONS

International Preliminary Report on Patentability for the corresponding patent application No. PCT/US2010/057555 dated Nov. 22, 2010.

"Directional Control Valve VP170, Proportional, Load Sensing, Pressure Compensated", Parker Catalog HY14-2006US, 2006.

"VP170 Load-Sense Directional Control Valve", Parker Bulletin HY14-2006-M1/US Service Bulletin, Effective Oct. 15, 2006.

* cited by examiner

HYDRAULIC VALVE WITH PRESSURE LIMITER

CROSS REFERENCE TO RELATED APPLICATIONS

This application is a national phase of International Application No. PCT/US2010/057555 filed Nov. 22, 2012 and published in the English language which claims the benefit of the filing date of U.S. Provisional Patent Application Ser. No. 61/314,620, filed 17 Mar. 2010, both of which are incorporated herein by reference in their entireties.

TECHNICAL FIELD

This invention relates to a flow control valve that controls flow and pressure of a fluid in response to an input command. More particularly, this invention relates to a flow control valve and to a hydraulic fluid power system in which the valve is used.

BACKGROUND OF THE INVENTION

Hydraulically controlled machinery is well known and may be used in stationary, mobile, aerospace, marine and other applications. Hydraulic machinery commonly includes one or more main flow control valves, which are typically directional control valves. A main flow control valve is a fluid valve that is operated directly or indirectly by an external input command. The external input command may be, for example, a lever or joy stick that is operated by a human operator, a pilot signal, an electrical signal, a computer program, a wireless signal, or any other input that directly or indirectly causes operation of a valve.

Each main flow control valve may include a main flow control spool or other main valve that is operated in response to the input command to control fluid flow and pressure to one or more associated hydraulic fluid receiving devices of the machinery. The hydraulic fluid receiving devices may include one or more hydraulic storage devices such as tanks or accumulators, hydraulic motors such as hydraulic cylinders or rotary actuators or gerotor motors or gear motors, other hydraulic valves or subsystems, and/or any other devices that receive hydraulic fluid. Commonly, the machinery may include a plurality of main flow control valves for supplying and/or operating different hydraulic fluid receiving devices in a hydraulic system of the machinery. A main flow control valve and its associated controls (for example, an associated pressure compensator valve) are referred to as a main flow control valve combination. Various valves of the main flow control valve combination may be incorporated into a unitary valve housing, and each such device is referred to as a working section. Working sections of the same or different configuration may be combined, for example in a side by side arrangement. A working section combined with other sections (for example, other working sections and/or an inlet section or an outlet section) is referred to as an assembly of valve sections.

A working section operates by controlling the cross-sectional area of a main flow control valve variable orifice. Typically, the main flow control valve variable orifice is located in a fluid flow path extending between an inlet passage and an outlet passage. The inlet passage may be connected directly or indirectly to a source of fluid flow and pressure, and the outlet passage may be connected directly or indirectly to one or more of the fluid receiving devices. The flow through a given main valve orifice area is dependent upon the pressure drop across the orifice, and more specifically is proportional to the square root of the pressure drop across the orifice.

Pressure compensated working sections are also well known. A pressure compensated working section is a working section that includes a pressure compensator valve arranged to maintain a substantially predetermined pressure drop across a variable orifice under normal operating flow conditions independently of the inlet or outlet pressure. By maintaining this substantially constant pressure drop across the orifice, a constant and repeatable flow rate through the orifice is achieved for any orifice area that is selected by the input command. Commonly, the pressure drop may be controlled in part by a pressure compensator spool and by the force of a biasing device such as a spring acting directly or indirectly against the spool.

Working sections may also commonly include load sense passages. The load sense passages may be operably connected to provide (i.e., transmit) a pressure feedback signal from an outlet passage, which indicates the fluid pressure required by the fluid flow receiving device associated with the valve. The load sense passage may be operably connected to a variable displacement hydraulic pump or other source of pressure and flow to provide a feedback signal to the source. The flow rate or pressure of the source may be altered in response to the feedback signal to meet the demand of the fluid flow receiving device. In the case of working sections and/or multiple fluid flow receiving devices in the system, check valves may be used to supply the highest working pressure required by the fluid flow receiving devices as the feedback signal to the source of pressure and flow.

Commonly, the source of hydraulic flow and pressure in the machinery provides a margin pressure in response to the pressure feedback signal. The margin pressure is a predetermined pressure differential above the pressure feedback signal. For example, if a margin pressure is 300 psi (20.7 bar), a pressure feedback signal of 2,500 psi (172.5 bar) will result in the pump or other source of fluid pressure and flow attempting to maintain a pump outlet pressure of 2,800 psi (193.1 bar).

The pressure and flow output provided by the source is connected to the inlet passage of each working section. Typically, each working section of an assembly of valve sections may be controlled by its input command independently of the other working sections for providing the appropriate flow and pressure to its associated hydraulic fluid receiving device. If the hydraulic receiving device is a hydraulic actuator, for example, the displacement and speed of the hydraulic actuator is thus controlled by its associated working section Pressure compensated working sections such as described above may generally be one of two basic types. A pre-compensated working section may include a pressure compensator valve located prior to (or upstream of) the main valve variable orifice. A post-compensated working section may include a compensator valve located after (or downstream of) the main valve variable orifice. One advantage of a post-compensated working section is that it may allow flow sharing amongst the various fluid flow receiving devices in a system in response to an over-demand situation. For example, if the pump is not capable of providing sufficient flow to actuate each actuator as desired by the input command, an assembly of working sections having a plurality of post-compensated working sections may reduce the flow to each actuator proportionally. This occurs since all of the working sections of the assembly use the same load sense pressure and the pressure supplied by the source is based upon this load sense pressure. Pre-compensated working sections may be made to allow flow sharing by adding additional components, however, the use of a post-compensated control valve for flow sharing generally may be more economical.

In a traditional load sense working section fluid system, when an outlet passage of a main flow control valve combination becomes deadheaded, the fluid pressure in the outlet passage may be limited only by an associated relief valve. Deadheading is an operating condition in which a working section (or main flow control valve combination) is provided with fluid pressure from the pressure source but substantially no flow through the main flow control valve variable orifice occurs. Deadheading may occur, for example, when flow is directed toward an associated fluid receiving actuator and movement of the actuator in response to the flow is somehow restricted or stopped. Deadheading may occur at the end of a cylinder's physical stroke, or by a load that is sufficient to resist the further movement of the actuator. As the flow directed from the outlet passage of the working section to the deadheaded actuator decreases substantially to zero, the pressure between the working section and the actuator may increase until an associated relief valve opens to dump the excess flow to tank so as to limit outlet passage pressure. When a deadhead condition occurs, a system with a typical known load sense working section may transmit the increased deadhead pressure through the load sense passages, causing unneeded system pressure increase and dumping the increased pressure and flow over the relief valve to tank. This may result in an inefficient or wasteful use of energy (flow and pressure from the source) and a buildup of heat in the hydraulic system.

Typical directional control valves, including proportional, load sensing, and pressure compensated valves, and applications for these various valves, are shown and explained in Parker-Hannifin Corporation, Cleveland, Ohio, USA, Catalog HY14-2006/US and Service Bulletin HY14-2006-M1/US, available at www.parker.com. The referenced Catalog shows, inter alia, a basic post pressure compensated valve assembly schematic at page 10 and work port relief valves at page 22. The referenced Service Bulletin shows, inter alia, relief valves at pages 25, 47-49 and load sense relief valves at pages 4, 6 and 22.

SUMMARY OF THE INVENTION

The present invention provides a flow control valve that minimizes fluid flow loss and minimizes transmitted load sense pressure increases upon the occurrence of a deadhead or other excess pressure condition. Further, the invention provides an integral pressure compensator and pressure limiter. Still further, the invention provides a main flow control valve combination, and a hydraulic circuit, that provides pressure limit control and load sense signal control and pressure compensation.

According to a preferred embodiment, the invention provides a fluid flow path, a pressure compensator valve in the path that maintains a substantially constant pressure differential and flow rate, and a pressure limiter valve that restricts flow through the path when a selected limit pressure is reached. The pressure compensator valve and pressure limiter valve may be integral, with the pressure limiter valve being carried by the pressure compensator valve. The pressure limiter valve may act to cause the compensator valve to restrict fluid flow through the path when the selected pressure limit is reached. The terms restrict or close include partially and fully close, and the term open includes partially and fully open.

The valve combination and integral valve of the invention may be incorporated in a working section of a single or multiple working section valve section assembly. Each of the valve sections may include a main directional control valve, a work port, and a load sense passage. The load sense pressure in the highest pressure work port of the assembly may be transmitted to a variable output source of fluid and to the load sense passage of each working section. The working section according to the preferred embodiment may increase the load sense pressure in the working section but limit transmission of an increased load sense pressure to the other working sections.

More specifically, an integral pressure compensator valve and pressure limiter valve may be provided that includes a fluid flow path. A pressure compensator valve and a pressure limiter valve may be disposed in the fluid flow path and may divide the fluid flow path into an upstream side and a downstream side.

The pressure compensator valve may include a pressure compensator spool that carries a pressure compensator valve surface, and the pressure compensator valve surface may be movable with the pressure compensator spool and define a variable area fluid orifice in the fluid flow path. The pressure compensator spool may have at least one radial closing surface area exposed to fluid pressure at a location on the downstream side to urge the pressure compensator spool and the pressure compensator valve surface toward closed positions to close the orifice. The pressure compensator spool may also have at least one opening radial surface area exposed to fluid pressure at a location in the upstream side to urge the pressure compensator spool and the pressure compensator valve surface toward opened positions to open the variable orifice.

Further according to the preferred embodiment, the pressure limiter valve may include a pressure limiter spool that carries a pressure limiter valve surface, and a pressure limiter passage may establish fluid pressure communication between a location in the fluid flow path upstream side and at least one pressure compensator spool closing radial surface area. The pressure limiter valve surface may be movable longitudinally with said pressure limiter spool to open and close the pressure limiter passage. The pressure limiter spool may have at least one opening radial surface area exposed to a limit fluid pressure in the downstream side to urge the pressure limiter spool and the pressure limiter valve surface toward their opened positions to open the pressure limiter passage and close the pressure compensator valve surface when a selected pressure level is reached. Orifices limit communication to the load sense chambers of other working sections and/or to the fluid pressure source.

Still more specifically the fluid flow path and the pressure compensator valve and the pressure limiter valve may be disposed in a housing. The housing may be one valve section of an assembly of valve sections, and each valve section may include a main flow control valve and a work port. Each main flow control valve may be a directional control valve. The housing of the one valve section may include a load sense passage, and the main flow control valve may be in the upstream side of the one valve section. The load sense passage may hydraulically connect at least one closing radial surface area of the compensator spool with the highest pressure level in all of said work ports. The housing may also have a spool bore, and the pressure compensator spool and the pressure limiter valve spool may be coaxially disposed in the spool bore. The pressure compensator spool may include another spool bore, and the coaxial pressure limiter spool may be slidably disposed in such other spool bore and carried by the pressure compensator spool.

A first biasing device may act against the pressure compensator spool and bias the pressure compensator spool and the pressure compensator valve surface toward their closed positions. A second biasing device may act against the pressure limiter spool and bias the pressure limiter spool and the pressure limiter valve surface toward their closed positions.

A control chamber may be exposed to fluid pressure at a location in the downstream side. A load sense passage and a drain passage may be connected to the control chamber. A first control orifice may be disposed intermediate the control chamber and the load sense passage, and a second control orifice—may be disposed intermediate the control chamber and the drain passage. At least one pressure compensator radial closing surface area may be exposed to fluid pressure in the control chamber to urge the pressure compensator spool and the pressure compensator valve surface toward their closed positions to close the variable orifice in the flow path. At least one pressure limiter radial closing surface area may also be exposed to fluid pressure in the control chamber to urge the pressure limiter spool and the pressure limiter valve surface to their closed positions to close the pressure limiter passage and prevent excess pressure in the control chamber.

The pressure limiter passage may establish fluid pressure communication between the control chamber and a location in the upstream side of said fluid flow path. The housing may include a center spool gallery disposed in the fluid flow path between the main control spool and the integral pressure compensator valve and pressure limiter valve. The housing may further include a work port and an intermediate feed passage disposed in the fluid flow path between the integral pressure compensator valve and pressure limiter valve and the work port of the one valve section. The pressure compensator spool and the pressure limiter spool may be disposed in a spool bore opening into the center spool gallery, and at least one opening radial surface area of the pressure compensator spool and at least one opening radial surface area of the pressure limiter spool may each be exposed to fluid pressure in the center spool gallery. At least one opening radial surface area of the pressure limiter spool may exposed to fluid pressure in the intermediate feed passage, and this pressure may act to open the pressure limiter spool when a selected limit pressure is reached.

The integrated pressure compensator valve and pressure limiter valve and the housing together may provide a working valve section in an assembly of at least two working valve sections. Each of the working valve sections may have its own main flow control valve and load sense passage, and the control chamber may be exposed to the highest load sense pressure in the assembly of working valve sections. A pressure compensator valve spring may bias the pressure compensator valve spool toward its closed position, and a pressure limiter valve spring may bias the pressure limiter valve spool toward its at rest position. The pressure limiter valve spring may act between the pressure compensator spool and the pressure limiter spool. Each of the springs may be disposed in the spool bore. The pressure limiter valve spring may be disposed between the pressure compensator valve spring and the pressure compensator valve spool. A force transmitting spool may extend from the pressure compensator valve spring, through the pressure limiter valve spring, to the pressure compensator valve spool. Still further, the fluid pressure acting on at least one opening radial area of the pressure limiter valve spool may be the fluid pressure in the intermediate feed passage. A drain passage may extend from the pressure compensator valve spool bore in which said pressure limiter valve spool is disposed.

The pressure limiter passage may include an axial passage in the pressure limiter spool, and the pressure limiter passage may be in fluid pressure communication with the control chamber. The pressure compensator valve spool and the pressure limiter valve spool may have cooperating radial passages connecting the center spool gallery to the pressure limiter passage and to the control chamber when the pressure limiter valve spool is in its opened position. A source of variable fluid pressure and flow may be connected to the inlet side and a fluid receiving device may be connected to the outlet side. The flow control orifices may restrict the fluid pressure in the load sense chamber and may limit communication of the load sense chamber pressure to the other working sections and to the fluid pressure source controller.

The invention also provides various ones of the further features and structures described in the claims set out below, alone and in combination, which claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

The principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1:
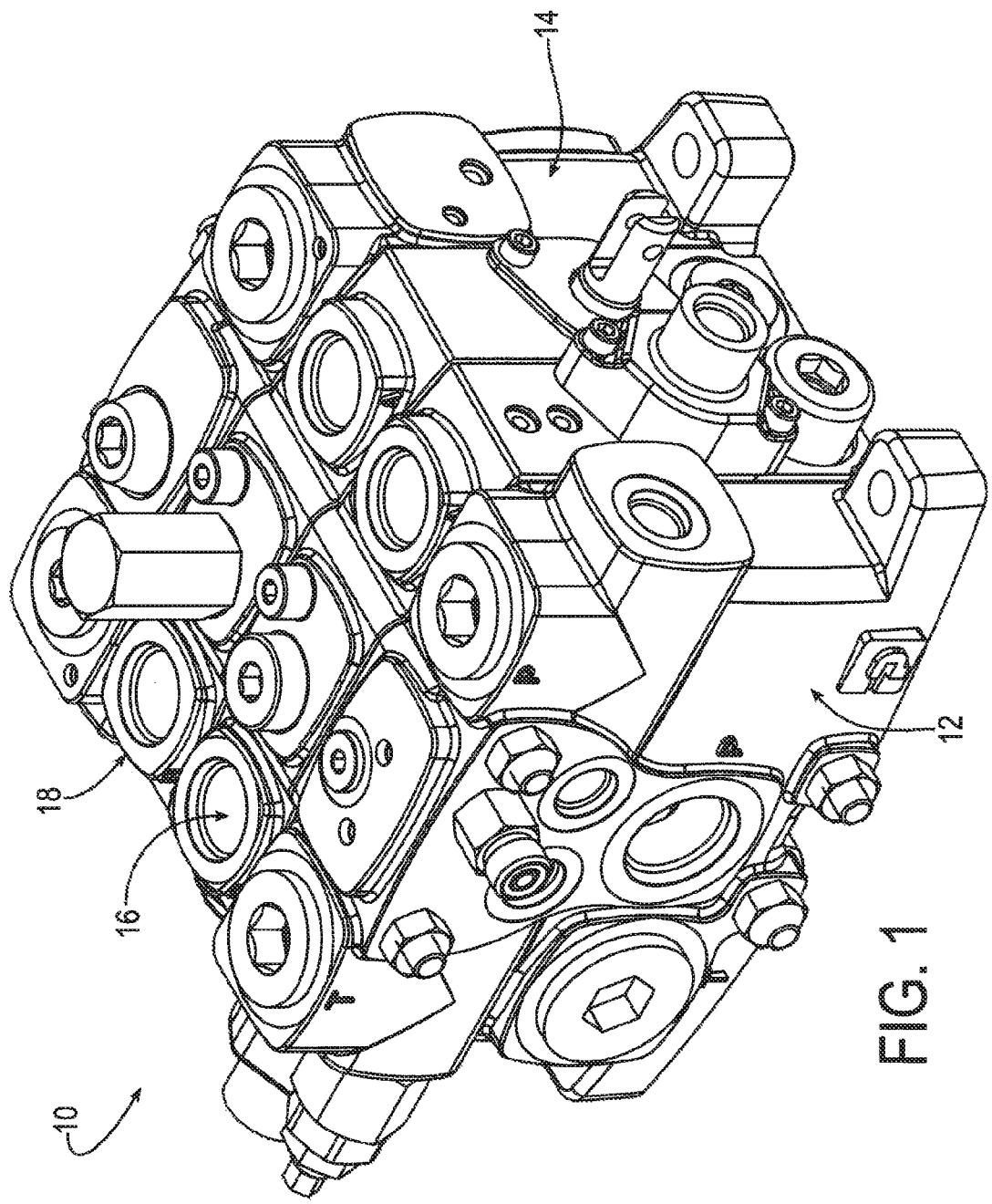
FIG. 1 is a perspective view of a valve combination according to one embodiment of the present invention, with the components of the combination arranged in a unitary valve assembly.

FIG. 1 is a perspective view of an assembly of valve sections 10 according to a preferred embodiment of this invention. The valve section assembly 10 includes individual sections that are coupled together by bolts in a known manner to provide an assembly of valve sections 10 that is a unitary assembly. The term unitary means of a single piece construction or of a multi-piece construction assembled such that the multiple pieces function as a single piece without external fluid hoses or other external fluid pressure lines. The sections of the valve section assembly 10 include a known inlet section 12 adjacent a first end of the assembly of valve sections 10 and a known outlet section 14 adjacent a second, opposite, end of the assembly of valve sections 10. The valve section assembly 10 in the preferred embodiment also includes two working sections 16 and 18. Each of the working sections includes a main flow control valve combination described above and also described more fully below. The working sections 16 and 18 are positioned adjacent one another and are located between the inlet section 12 and the outlet section 14 of the assembly of valve sections. Those skilled in the art should recognize that any number of working sections may be included in the assembly of valve sections 10.

The assembly of valve sections 10 illustrated in FIG. 1 is a load sense assembly of valve sections that provides a pressure feedback signal through a feedback passage 19 (shown schematically in FIG. 3) to a variable displacement pump 20 (also shown schematically in FIG. 3) or other source of fluid pressure and flow. The pressure feedback signal of the assembly of valve sections 10 is the work port pressure of the working section 16 or 18 that has the highest pressure level in the valve assembly 10 and typically is determined through the use of load sense check valves (not shown in FIG. 1) in a known manner.

Figure 3:
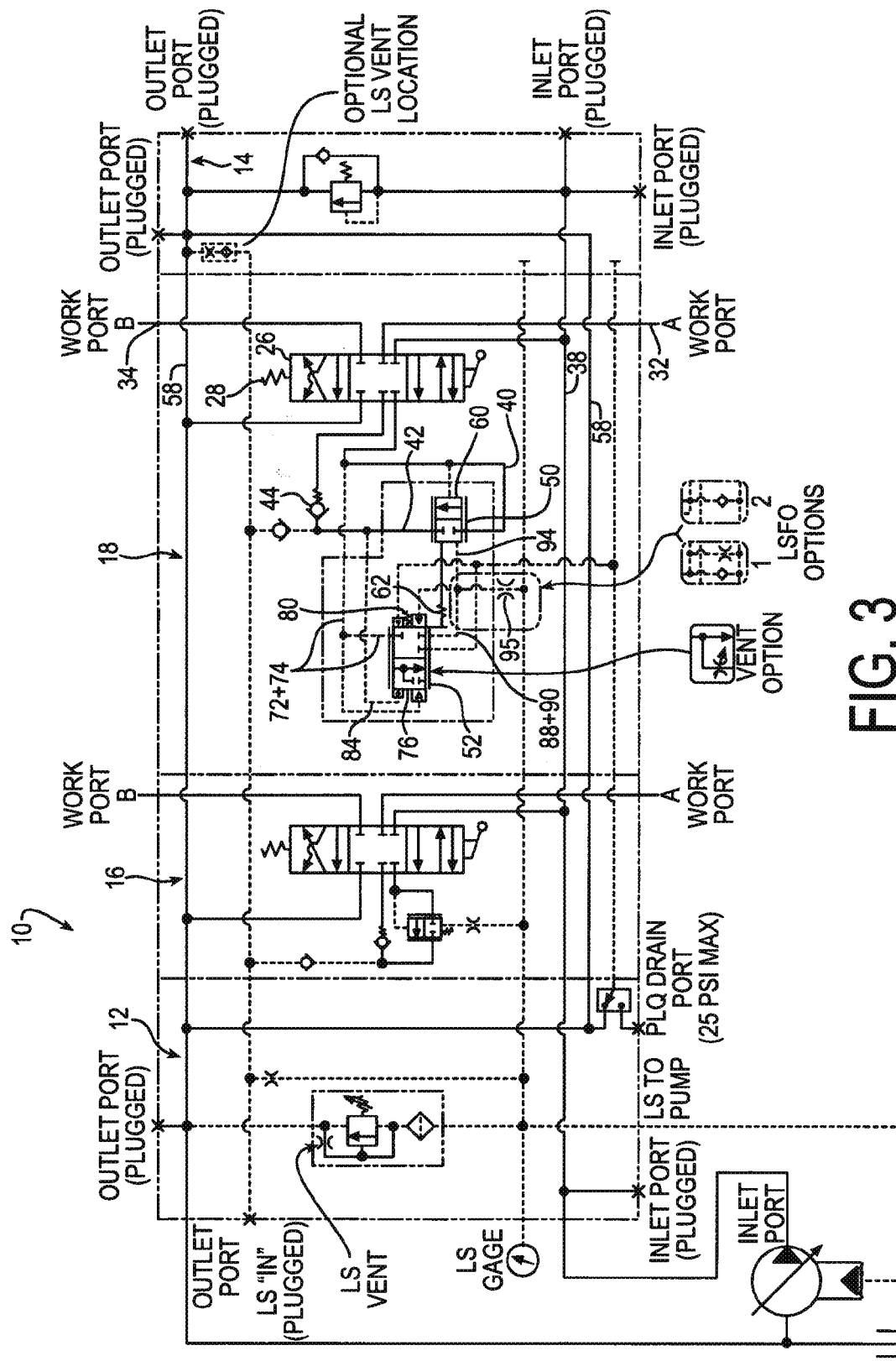
FIG. 3 is a schematic view of the valve assembly illustrated in FIG. 1.

The working sections 16 and 18 of the valve section assembly 10 may be the same as one another or may be different from one another. In the embodiment shown in FIG. 1, the working section 16 is a known conventional load sense post-compensated main control valve construction. FIG. 3 is a schematic hydraulic circuit diagram showing an embodiment of the hydraulic circuit in which the assembly of valve sections 10 is used and showing the configuration of the assembly of valve sections 10. As shown in FIG. 3, the working section 16 has a known conventional construction and the working section 18 is constructed in accordance with a preferred embodiment of the present invention.

Figure 2:
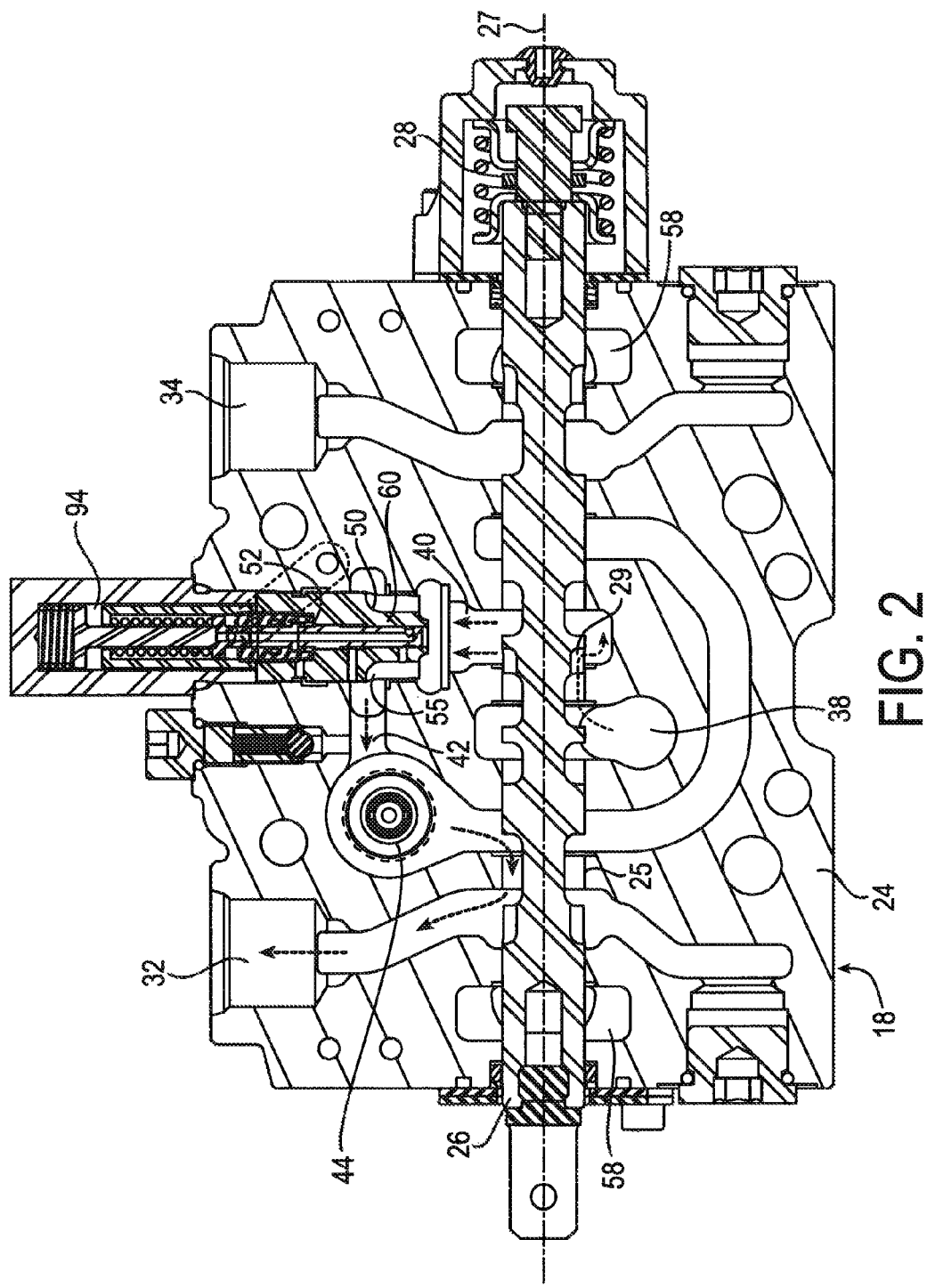
FIG. 2 is a cross sectional side elevation of one of the working sections of the valve assembly illustrated in FIG. 1, taken along reference view line 2-2.

FIG. 2 illustrates a sectional view of an exemplary embodiment of the working section 18, constructed in accordance with the present invention. As mentioned above and explained more fully below, the working section 18 includes a main flow control valve combination that includes a plurality of control devices including a main flow control valve 21. The control devices of the working section 18 in this embodiment are preferably all arranged in the working section 18 in a unitary single piece housing 24. The term main flow control valve means a fluid valve located in a fluid flow path and being responsive to an input command. The term main flow control valve combination means a main flow control valve and its associated fluid controls (for example, an associated pressure compensator valve and/or pressure limiter valve).

With specific reference to FIG. 2, the unitary housing 24 of the working section 18 includes a longitudinally extending main flow control valve through-passage 25 for receiving a main control spool 26 having a longitudinal axis 27. A first end of the main control spool 26 is adapted to be connected to an external input command device of the type described above, and a second end is acted upon by a biasing means 28 for returning the control spool to a neutral, closed position, all in a well known manner. It should be noted that the control spool 26 of FIG. 2 is illustrated in a position moved longitudinally rightward away from its neutral position, to open a main valve variable area orifice 29. First and second work ports 32 and 34 extend generally radially into the body 24 relative to the longitudinal axis 27 (vertically in the orientation shown in FIG. 2) and intersect the through-passage 25 that carries the control spool 26.

The body 24 also includes an inlet passage 38 for receiving an inlet flow from the source 20. The inlet passage 38 is spaced longitudinally a short distance from a center spool gallery 40 along the through-passage 25. The center spool gallery 40 is connected to an intermediate feed passage 42 within which a known load check valve 44 is located. A pressure compensator valve 50 is located between the center spool gallery 40 and the intermediate feed passage 42, so that the center spool gallery 40 and the intermediate feed passage 42 provide inlet flow and outlet flow passages, respectively, for the compensator valve 50. The through-passage 25, center spool gallery 40 and intermediate feed passage 42 provide a fluid flow path (illustrated in part by arrows in FIG. 2) extending between the inlet passage 38 and the work ports 32, 34. The upstream side of the pressure compensator valve 50 is everything in the fluid flow path upstream of the pressure compensator valve 50, including the center spool gallery 40 and the main flow control valve 21 and the source 20. The downstream side of the pressure compensator valve 50 is everything in the fluid flow path downstream of the pressure compensator valve 50, including the intermediate feed passage 42 and load check 44 and work port 32, 34 and flow receiving device and tank.

The main flow control valve 21 and the compensator valve 50 are both disposed in the fluid flow path. The term pressure compensator valve means a fluid valve, located in a fluid flow path, having a valve spool having cross sectional areas exposed to fluid pressure at different locations in the fluid flow path, and arranged to maintain a predetermined pressure differential.

In the embodiment illustrated in FIG. 2, and as further described below, the pressure compensator valve 50 carries and is integral with a pressure limiter valve 52. The term integral means two or more functionally different cooperating devices that are assembled without externally exposed fluid connections and used as a whole such that at least one of the devices is an essential part to complete the other. The term pressure limiter valve means a fluid valve, located in a fluid flow path, and having a valve spool having a closing radial (cross sectional) surface area exposed to fluid pressure in at least one location in the fluid flow path and arranged to close flow through the fluid flow path when a set pressure is reached at that location. The structure and operation of this integral compensator valve and pressure limiter valve according to the preferred embodiment is more fully discussed below. The intermediate feed passage 42, depending upon a position of the main flow control spool 26, directs fluid to one of the first or second work ports 32 or 34. The body 24 further includes passages 58 for selectively connecting the first and second work ports 32 and 34 to tank or drain 53 (FIG. 3).

During operation of the working section 18, the control spool 26 is moved either leftward or rightward, as viewed in FIG. 2, from its neutral position by the input command device. FIG. 2 illustrates the control spool 26 shifted rightward from its neutral position and, as a result, a seat member of the biasing means 28 is forced a short distance away from a corresponding seating wall. When the control spool 26 is shifted rightward in this manner as illustrated in FIG. 2, hydraulic fluid that has entered the working section 18 from source 20 through the inlet section 12 flows into the inlet passage 38. Fluid from the inlet passage 38 then flows through the main flow control valve 21 and into the center spool gallery 40. A movable valve surface of a land 54 of spool 26 cooperates with an adjacent stationary valve surface at the intersection of the through-passage 25 and center spool gallery 40, to define the variable area orifice 29 (FIG. 4) of the main flow control valve 21. The amount of fluid flowing from the inlet core 38 to the center spool gallery 40 varies depending upon the position of the control spool 26 (which controls the area of the variable area orifice 29) and the pressure of the fluid in the inlet core 38 and center spool gallery 40. As a result, a first pressure drop occurs as the fluid flows from the inlet core 38, through the main control valve variable area orifice 29, to the center spool gallery 40. Thus, the fluid pressure in the center spool gallery 40 is less than the pressure in the inlet core 38 whenever there is fluid flow through the working section 18.

This fluid flow, as illustrated by the arrows in FIG. 2, continues through the center spool gallery 40 and past the pressure compensator valve 50 and pressure limiter valve 52 to the intermediate feed passage 42. This fluid flow path through the working section 18 (or through the main flow control valve combination), as further illustrated by arrows in FIG. 2, continues past the load check valve 44 and is directed through a groove of the control spool 26 to its associated work port 32 or 34. In the example shown in the drawings, the fluid is directed to the first work port 32. The fluid is then directed through its associated fluid conduit to its associated fluid receiving device. At the same time, fluid flow returning from the associated fluid receiving device is directed into the second work port 34 of the working section 18, through another groove in the main control spool 26 and to one of the two tank passages 58 of the working section 18. The working section 18 works in a similar manner when the spool is moved leftward from its neutral position for directing fluid to the second work port 34 and receiving return fluid in the first work port 32.

The pressure compensator valve 50 includes a movable pressure compensator spool 60. The fluid pressure in the center spool gallery 40 acts upon an opening radial (cross sectional) surface area 68 (FIG. 6) of the pressure compensator spool 60 exposed to that fluid pressure. That fluid pressure exerts a force on the opening radial surface area 68 to urge the compensator spool 60 toward an opened position as viewed in FIG. 5 to allow and/or increase flow from the center spool gallery 40 to the intermediate feed passage 42. When fluid pressure in the center spool gallery 40 acting against area 68 increases to a level greater than the forces biasing the compensator spool 60 to its closed position (as described further below), the compensator spool 60 of the pressure compensator valve 50 moves radially away from the main valve longitudinal axis 27 (upwardly as viewed in the drawings) toward this opened position. The pressure compensator valve 50 creates a pressure drop between the center spool gallery 40 and the intermediate feed passage 42 during fluid flow conditions. Thus, the pressure of the hydraulic fluid in the center spool gallery 40 is greater than the pressure of the fluid in the intermediate feed passage 42 whenever there is fluid flow through the compensator valve 50.

Figure 4:
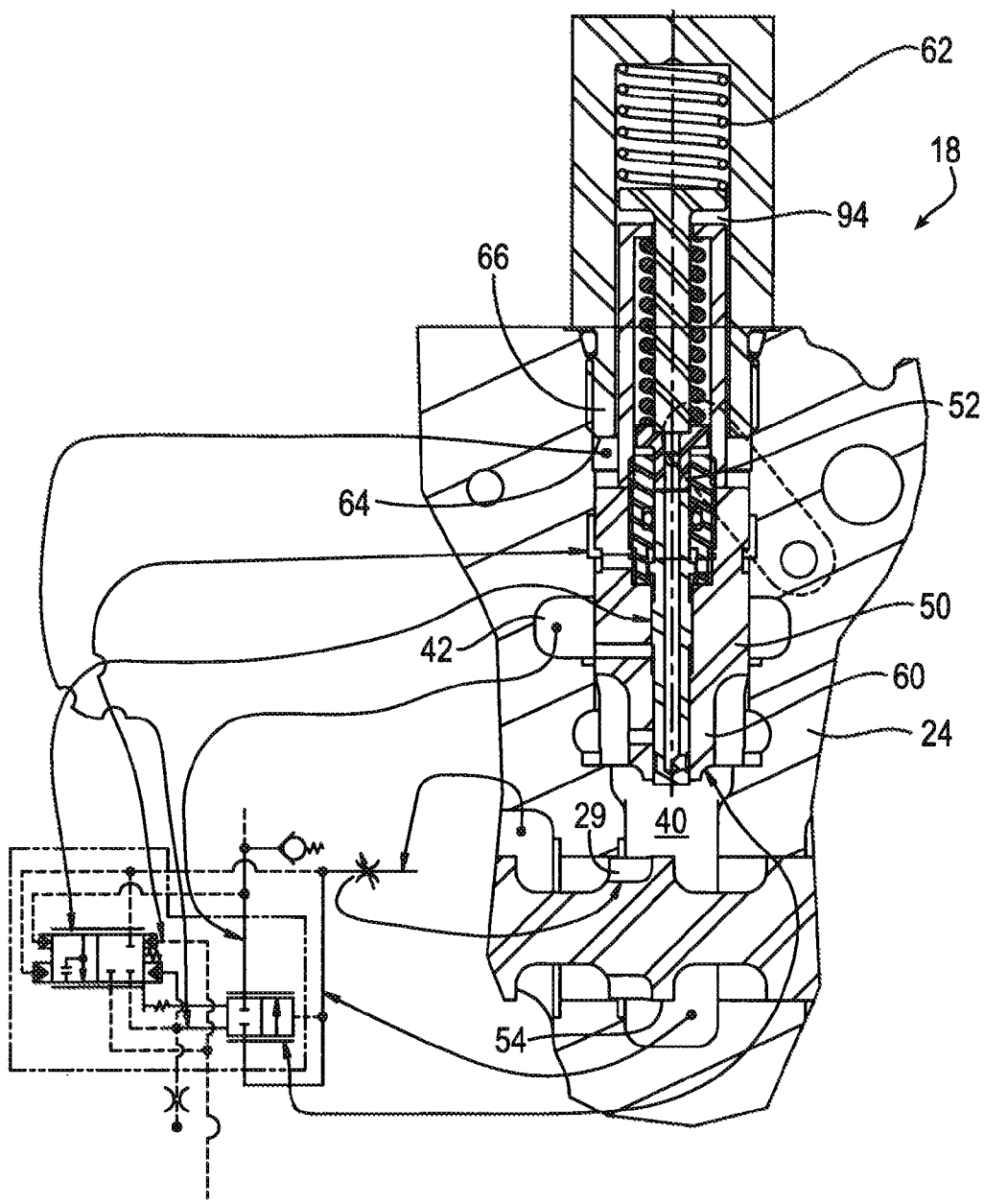
FIG. 4 is an enlarged view of a portion of FIGS. 2 and 3, showing a pressure compensator and pressure limiter according to the present invention in a closed position.
Figure 5:
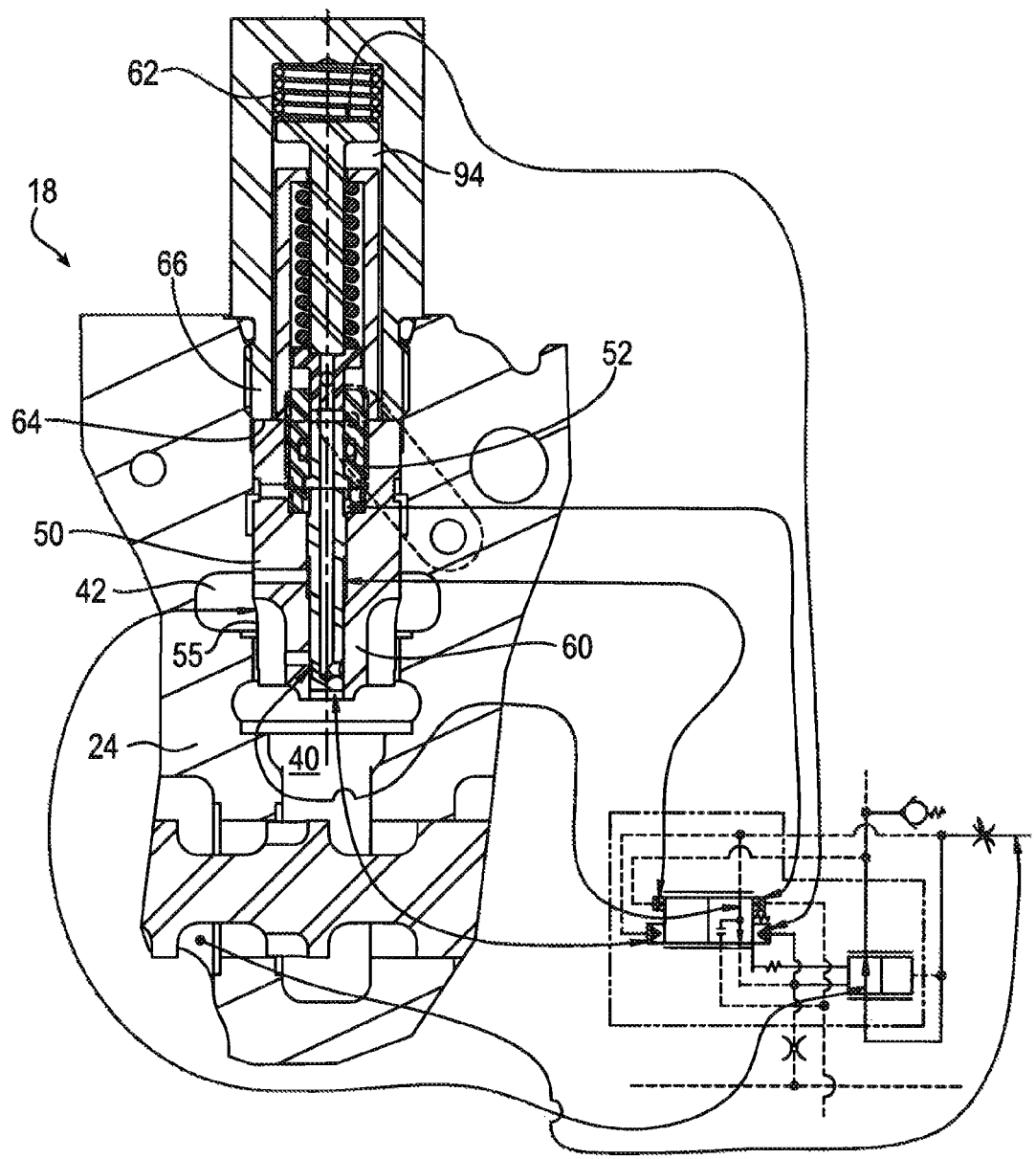
FIG. 5 is a view similar to FIG. 4, but showing the pressure compensator and pressure limiter according to the present invention in an opened position.
Figure 6:
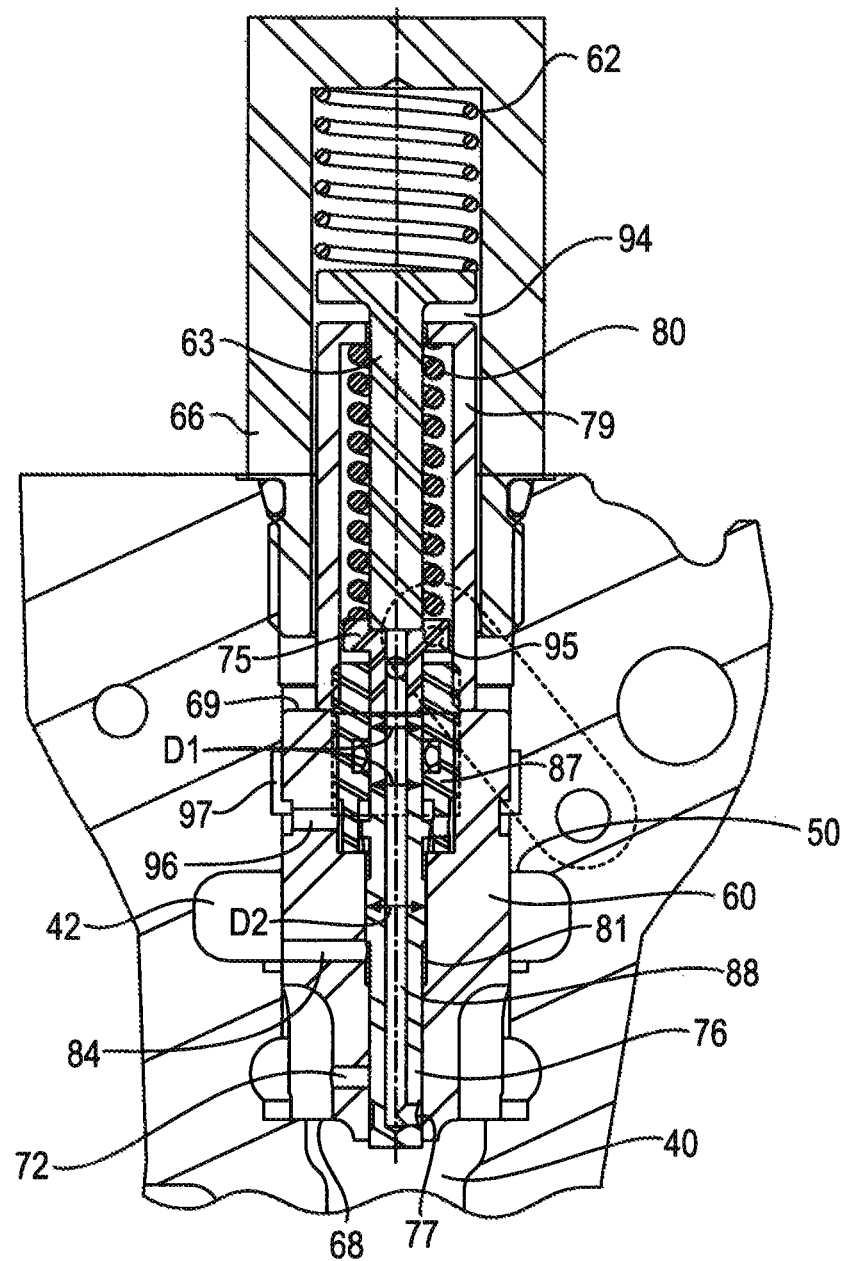
FIG. 6 is an enlarged view of a portion of FIG. 4.
Figure 7:
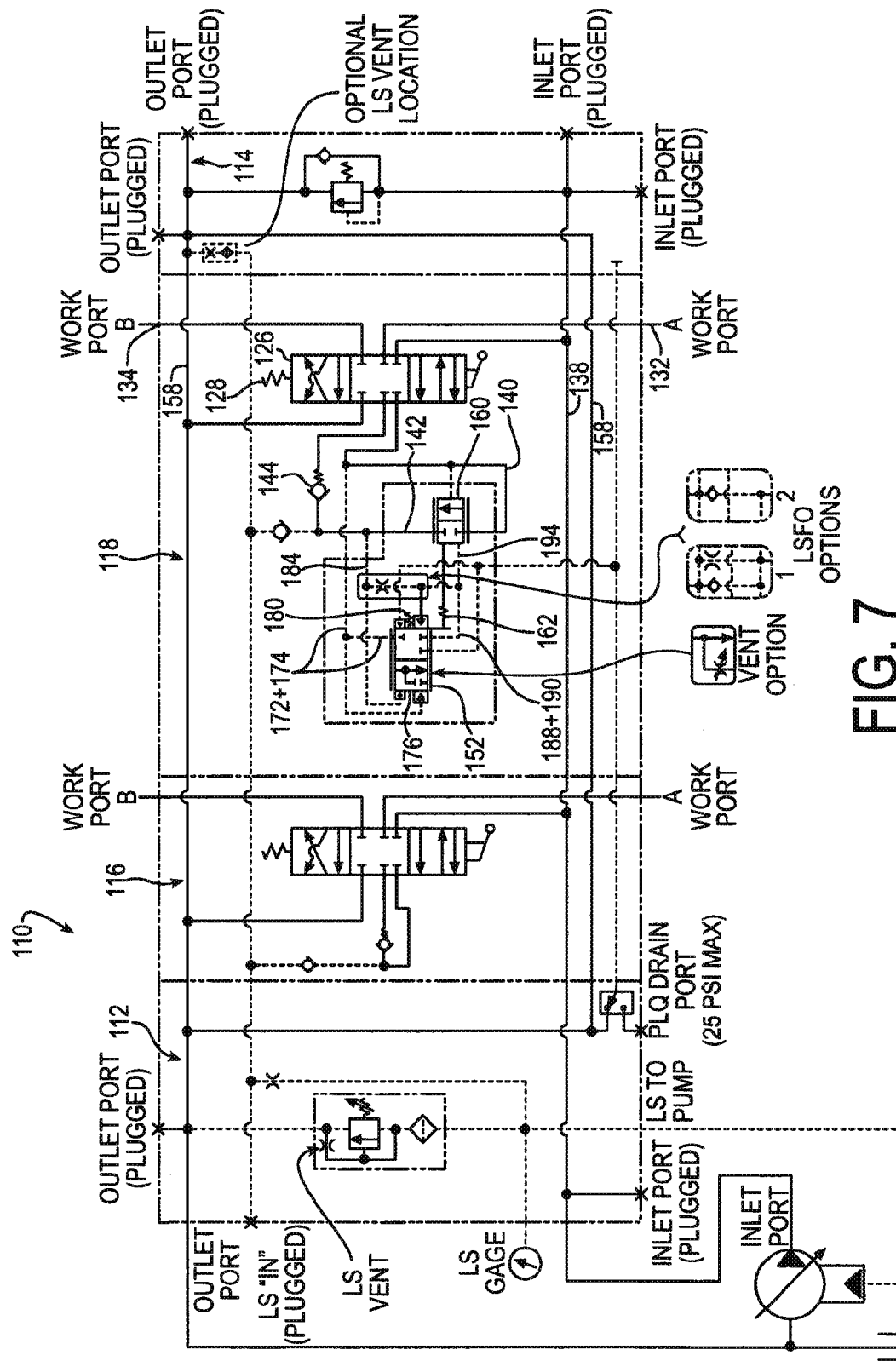
FIG. 7 is a schematic circuit diagram of another embodiment of the present invention.
Figure 8:
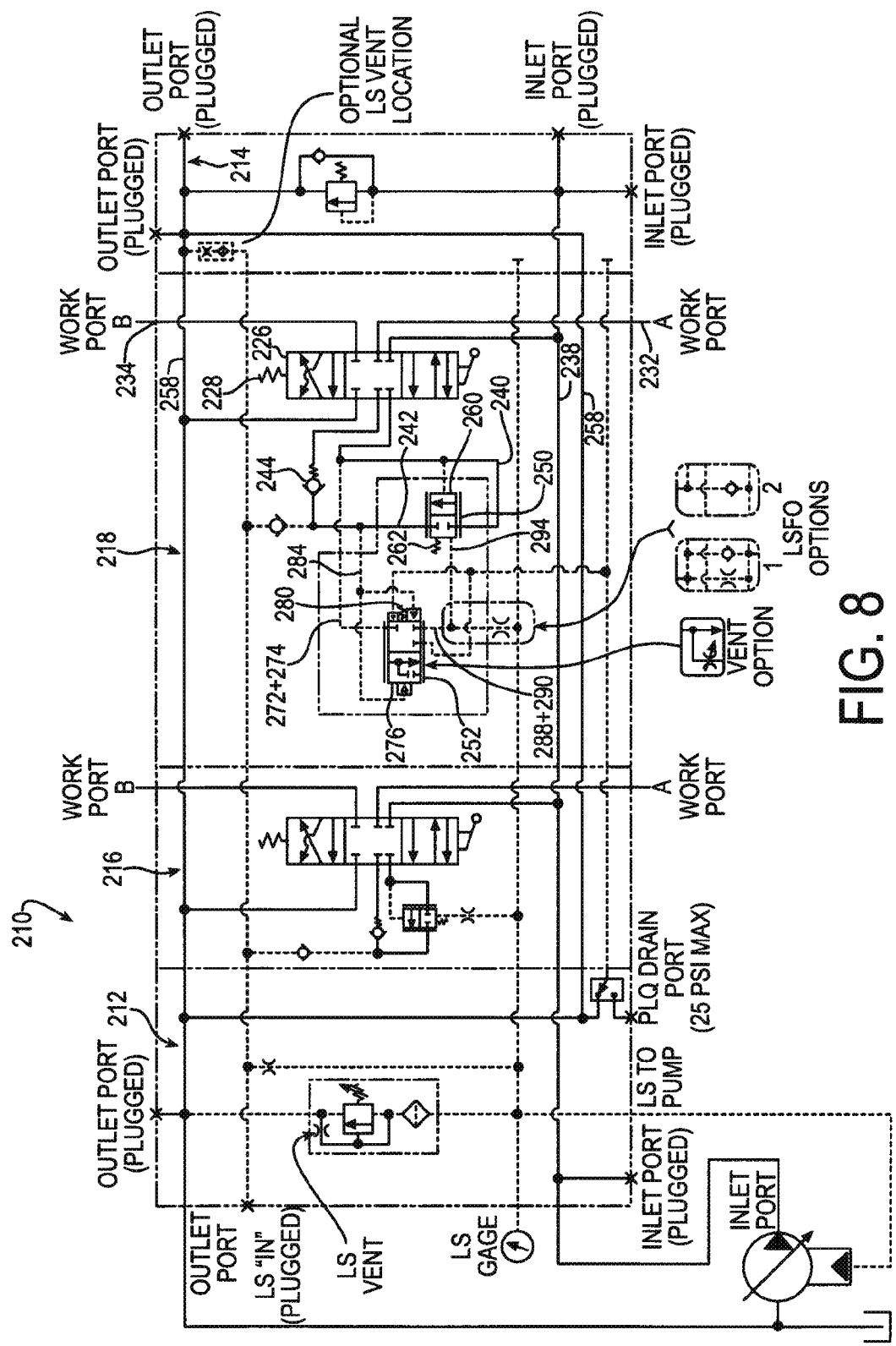
FIG. 8 is a schematic circuit diagram of still another embodiment of the present invention.
Figure 9:
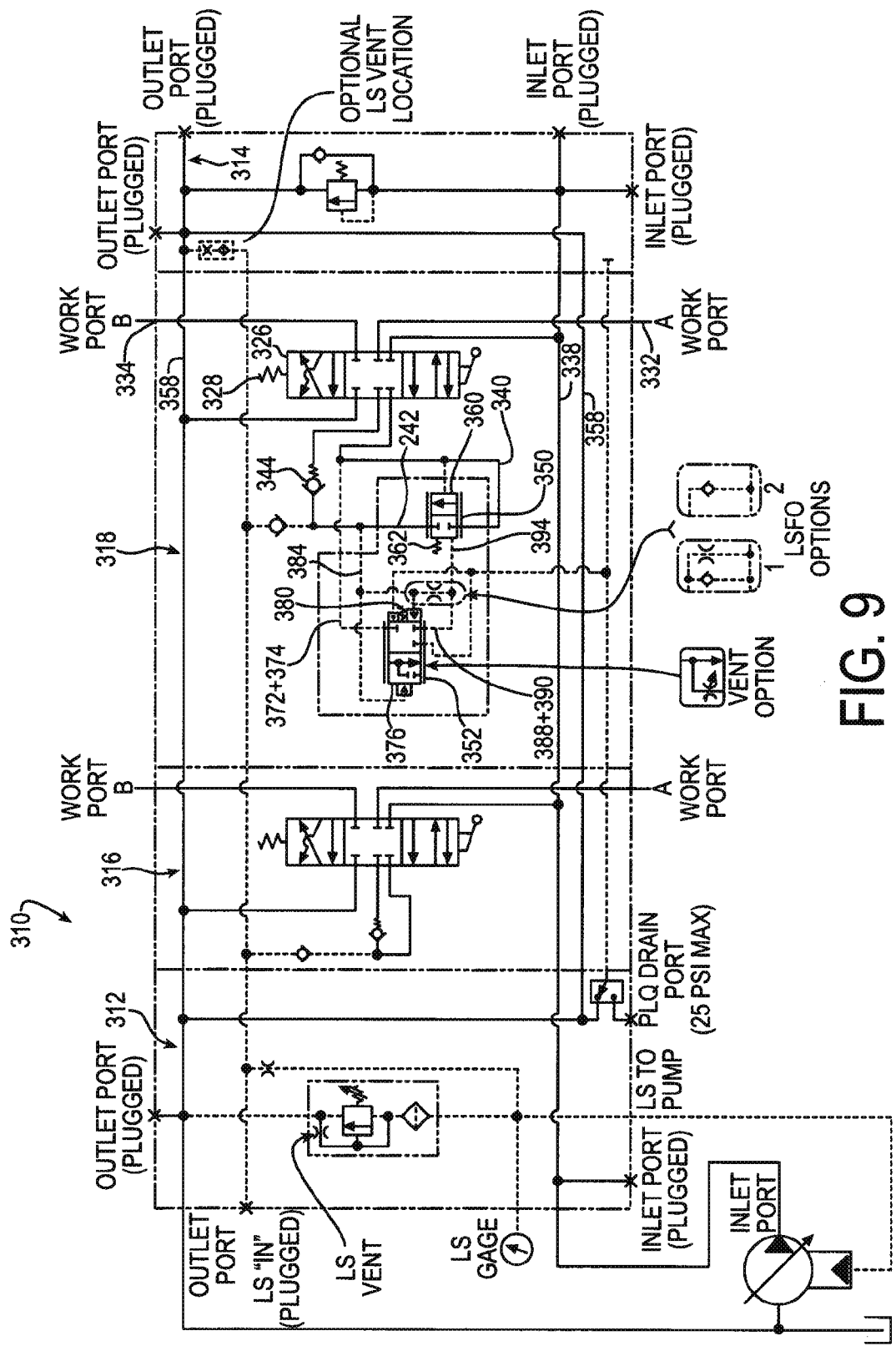
FIG. 9 is a schematic circuit diagram of still another embodiment of the present invention.
Figure 10:
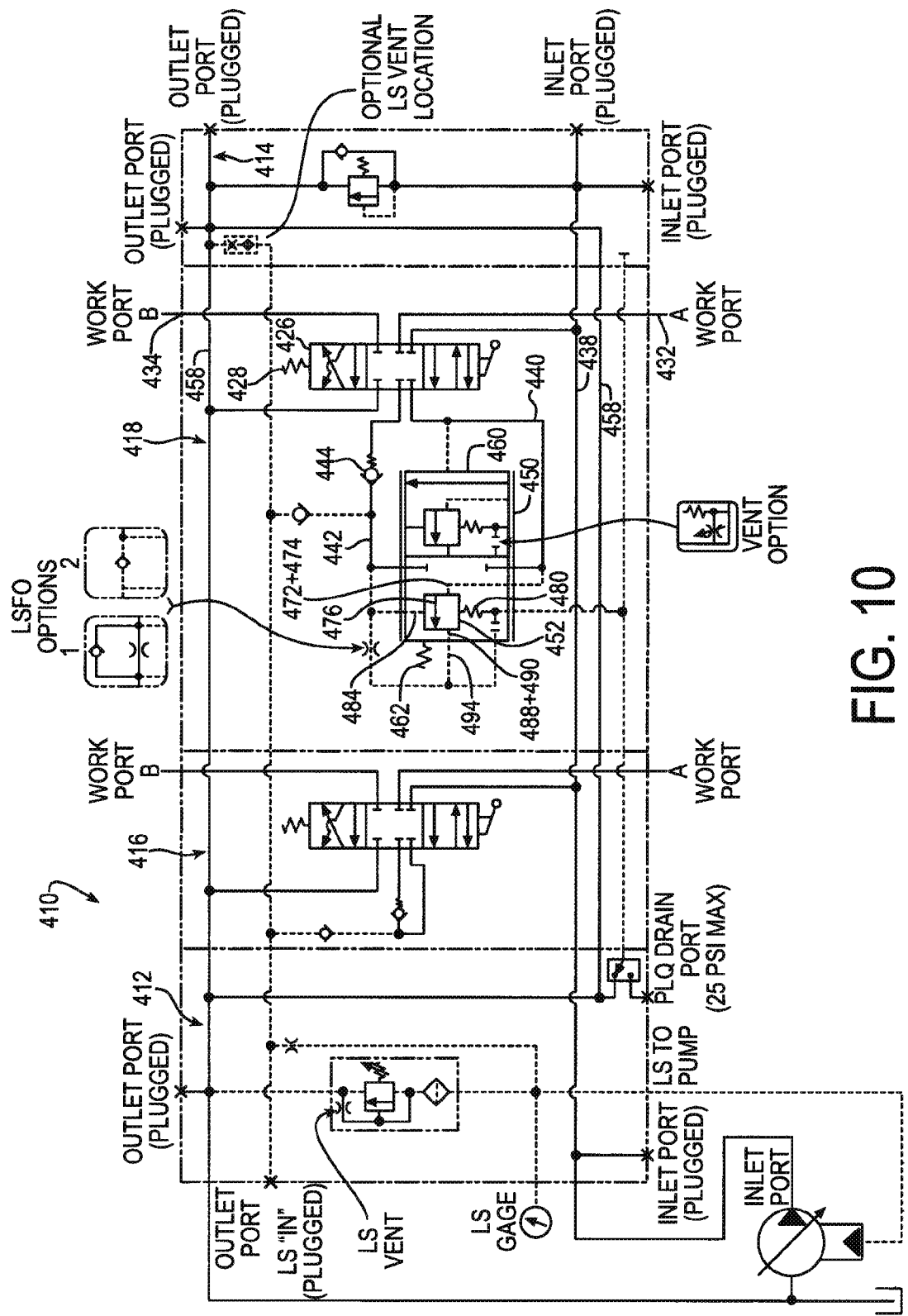
FIG. 10 is a schematic circuit diagram of still another embodiment of the present invention.
Figure 11:
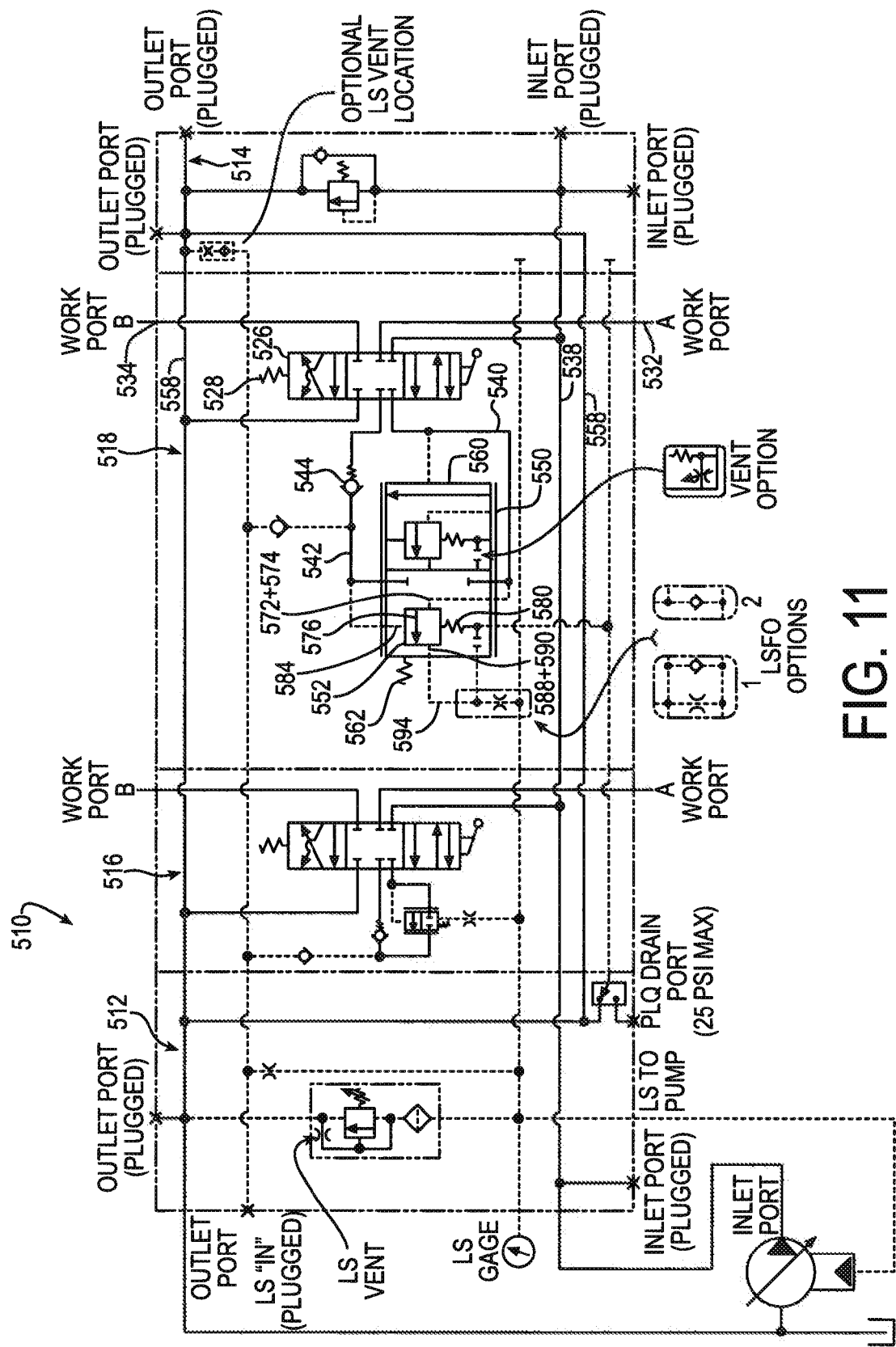
FIG. 11 is a schematic circuit diagram of still another embodiment of the present invention.

This operation of the pressure compensator valve 50 is known in the art and will be further described below with reference to FIGS. 2, 4, 5 and 6. FIGS. 4 and 6 illustrate the pressure compensator valve 50 in a closed position. FIGS. 2 and 5 illustrate the pressure compensator valve 50 in its opened position.

The pressure compensator valve 50 includes the above described pressure compensator spool 60 that is biased to its opened position by fluid pressure in the spool gallery 40 acting against the opening radial surface area 68. The pressure compensator spool 60 is, in a known manner, biased in the opposite direction to its closed position by a combination of a load sense pressure in load sense chamber 94 acting against a closing radial surface area 69 and a force of a compensator spring 62. The load sense pressure is transmitted to and from the chamber 94 through a suitable load sense orifice passage 95, more fully described below. The compensator spring 62 acts through a force transfer spool 63 and a force transfer guide 75 which in turn acts on the pressure compensator spool 60 through the limiter spool 76, to apply its biasing force against the spool 60 in a closing direction.

In response to the force of the fluid pressure in the center spool gallery 40 that acts in an opening direction against the opening radial surface area 68 exceeding or overcoming the opposing closing forces of the load sense pressure in the chamber 94 acting against the closing radial surface area 69 and the compensator spring 62, the compensator spool 60 opens to enable flow from the center spool gallery 40 to the intermediate feed passage 42. The opened compensator spool 60 creates a variable area orifice 55 (FIG. 5) between the center spool gallery 40 and the intermediate feed passage 42, and this variable orifice 55 creates a pressure drop between gallery 40 and passage 42. For example, if the pressure drop is 100 psi (6.9 bar), a pressure of the fluid in the center spool gallery 40 of 3,500 psi (241.4 bar) would be dropped to 3,400 psi (234.5 bar) in the intermediate feed passage 42. As further shown in FIG. 5, a terminal end 64 of a plug 66 is engaged by the compensator spool 60 to provide a stop for movement of the compensator poppet 60 to its fully opened position.

The main control valve combination or working section 18 also includes the pressure limiter valve 52 that is adapted to limit the output pressure of the associated working section. The pressure limiter valve 52 limits the pressure of the working section 18 to a predetermined amount. According to the embodiment shown in FIGS. 1-6, the pressure limiter 52 is carried by and is integral with the compensator valve 50. Referring specifically to FIG. 6, the pressure limiter valve 52 includes a first pressure limiter flow control passage 72 which is in fluid communication with the center spool gallery 40. The pressure limiter valve 52 also includes a pressure limiter spool 76. One end of the pressure limiter spool 76 has a closing radial surface area exposed to fluid pressure in a control chamber or load sense chamber 94, and the other end of the pressure limiter spool has an opening radial surface area exposed to fluid pressure in gallery 40. The pressure limiter spool 76 is biased to a first or closed position, as illustrated in FIG. 6, by a predetermined force, such as, for example, a spring force from a pressure limiter control spring 80. A pressure limiter valve spring retainer 79 is threadably secured to sleeve 87, so that spring 80 acts between pressure compensator spool 60 and the pressure limiter spool 76. A pressure limiter control passage 72 is formed within the compensator spool 60 and communicates with an annular groove 77 located in the pressure limiter control spool 76.

In response to fluid pressure in the work port (or intermediate flow passage 42) reaching a selected maximum or limit pressure, such pressure entering passage 84 and acting on an annular opening radial (cross-sectional) surface area 82 of the regulator spool 76 in a direction opposite the pressure limiter spring 80, moves the pressure limiter spool 76 upwardly, as viewed in FIG. 6 relative to the compensator poppet 60 and against the bias of the spring 80. The pressure limiter spool 76 includes an annular groove 77 that, when the pressure limiter spool 76 has moved a sufficient distance relative to the compensator spool 60, connects the fluid pressure received in the first pressure limiter flow control passage 72, through a second pressure limiter passage 88, to the chamber 94 located at an end of the compensator spool 60 for biasing the compensator spool 60 toward its closed position. In this condition of the pressure limiter spool 76, the fluid pressure acting on each end of the compensator spool 60 is equal to (or at least approximately equal to) the fluid pressure in center spool gallery 40, and the compensator spring 62 acts to close the compensator spool 60 to limit flow from the center spool gallery 40 to the intermediate feed passage 42. In this manner, the pressure limiter 52 may provide fluid pressure from the center spool gallery 40 to the chamber 94 at the end of the compensator spool 60 exposed to the chamber 94 when the pressure in the intermediate feed passage 42 reaches a predetermined or selected limit pressure, thus limiting the pressure in the intermediate feed passage 42 to that limit pressure. For example in FIG. 6, the pressure limiter spring 80 may be set to limit the fluid pressure in the intermediate feed passage 42 to 1,500 psi (103.4 bar). In the manner described above and shown in FIGS. 2 and 4-6, the integral compensator valve 50 and pressure limiter valve 52 according to the first embodiment of the invention utilizes the variable area orifice 55 and flow control valve surfaces of the compensator valve 50 to also provide the shut off valve surfaces of the pressure limiter valve 52 in the flow path. In this manner, the pressure acting on the surfaces 68 and 69 that normally influence the pressure compensation function also are used for achieving the pressure limitation function.

As readily apparent to those skilled in the art, the maximum pressure within the intermediate feed passage 42 as limited by the pressure limiter valve 52 establishes the maximum pressure within the work port 32. For example, if the flow rate through the intermediate feed passage 42 is zero, then the flow rate through the connected work port 32 will be zero and the pressure in the work port 32 will be equal to the pressure in the intermediate feed passage 42. If the flow rate through the intermediate feed passage 42 is greater than zero, then the flow rate to the work port 32 will be equal to such flow rate. Under this flow condition, there will be a pressure drop between the intermediate feed passage 42 and the work port 32 across the valve spool 26. The pressure regulator valve 52 is designed for a selected design flow rate to the working port 32 (which could be zero), and this design flow rate will produce a predetermined known pressure drop across the valve spool 26 between the working port 32 and the intermediate feed passage. Knowing this pressure drop, the selected maximum pressure in the intermediate feed passage 42 as limited by the pressure limiter valve 52 establishes the maximum pressure in the working port 32 for the design flow rate.

The above referenced Catalog, at page 10, shows a hydraulic schematic circuit diagram for a typical known post pressure compensated valve section assembly. The valve section assembly 18 according to the present invention may be used in hydraulic circuits of this referenced type, as illustrated in FIG. 3.

The load sense pressure in the chamber 94 of the valve section assembly 18 and circuit shown in FIG. 3 is the highest work port pressure in any work port of any of the working sections 16, 18 of the unitary valve section assembly 10. The load sense pressure is also the pressure that is fed back to the pump (or pressure source) 20 for establishing the pump output pressure. When the load sense pressure in the chamber 94 of the compensator valve 50 of working section 18 under normal operating conditions is the highest work port pressure in any of the working sections 16, 18 of the unitary valve section assembly 10, the pressure in chamber 94 is the system load sense pressure communicated to the pressure compensator of the working section 16 and to the source 20. If the pressure limiter valve 52 actuates (opens) as described above under this condition and begins to further increase the pressure in the chamber 94, such as may indicate a deadhead condition for example, this increasing pressure in chamber 94 may tend to begin to cause a corresponding increase in the load sense pressure communicated from the chamber 94 to the pressure compensator of the working section 16 and to the source 20. It is desirable to reduce or prevent communication of this increased pressure from the chamber 94 upon actuation of the pressure limiter valve 52, since such communication could cause unnecessary pressure increase from the source 20 and wasteful energy loss and heat increase. To reduce or prevent such adverse effect from this potential increase in the load sense pressure from chamber 94 communicated to the source 20 and to the other valve section 16 under this condition, load sense feed orifice (LSFO, which is indicated by reference number 95 in FIGS. 3 and 6) is sized and arranged to reduce pressure increases in the chamber 94 and to keep a proper differential pressure relationship between the pressure in the chamber 94 and the load sense pressure communicated from chamber 94 to the source 20 and to the other valve section 16. The pressure differential between the chamber 94 and drain is greater than the pressure differential between the chamber 94 and the load sense passage (i.e., the pressure differential across orifice 95). These arrangements limit the increase in the load sense pressure communicated to the source 20 and to the other valve section 16 under these conditions. Still further, this causes any increase in the pressure in the chamber 94 to be time delayed as it starts to be communicated to the load sense passages. In this manner, the cooperating orifice(s) arranged with the load sense chamber 94 provide a control device restricting load sense communication of the fluid pressure in the chamber 94 to the source 20 and to the valve section 16 when the chamber 94 is exposed to fluid pressure in the center spool gallery 40 by opening of the limiter valve 52.

Additional options for the restricting function described in the previous paragraph are also shown in FIG. 3. As shown in FIG. 3, the vent orifice for chamber 94 may be a variable orifice that is sensitive to the position of the pressure limiter spool position. Alternatively, the vent orifice for the chamber 94 may be a fixed orifice that is sized and arranged and fixed at one of several different orifice sizes. Also, the load sense feed orifice (LSFO) may optionally be combined with a one way check valve (option 1) or may be replaced with a one way check valve (option 2), so that flow into the chamber 94 is permitted while flow out of chamber 94 is prevented. Note that, when option 2 for LSFO is used, the illustrated vent option should be used to decay pressure in the chamber 94 during pressure limitation function.

A drain passage 96 in the compensator spool 60 provides communication to a drain passage 97 in the housing 24. Any fluid leakage between the pressure limiter spool 76 and the pressure compensator spool 60 will be drained through this passage when the compensator spool 60 is in an opened or closed position. In this manner, the differential area D2 minus D1 is drained to prevent pressure from building in that area and disrupting the force balance useful for operation of the pressure limiter function.

Although the integral pressure compensator valve 50 and pressure limiter valve 52 shown in the drawings and explained above is preferred, in alternative embodiments one or more of the control devices incorporated in the unitary single piece housing 24 in the preferred embodiment and described more fully below may be arranged in separate external housings that are connected with external fluid hoses or other fluid pressure lines to the housing that includes the main flow control valve. According to these alternative embodiments, a pressure limiter valve 52 that is separate from the compensator valve 50 may be used in place of the integral compensator valve and pressure limiter valve of the preferred embodiment described above. According to these alternative embodiments, a separate pressure limiter valve may be included in the body 24 in a pressure limiter bore spaced from the pressure compensator valve 50. Alternatively, a separate pressure limiter valve may be external to the housing 24 and external to the assembly of valve sections 10. In this still further alternative, a fluid flow connection between the separate pressure limiter valve and the assembly of valve sections 10 would be established by suitable fluid hoses or other fluid connector devices, provided that proper flow to and from the pressure limiter is established. In a still other alternative embodiment, an integral or separate pressure compensator and pressure limiter may be provided, in which a separate pressure limiter may be associated with each work port 32 and 34 of the working section 18. These alternative embodiments are not illustrated in the drawings but will be apparent to those skilled in the art.

Figure 12:
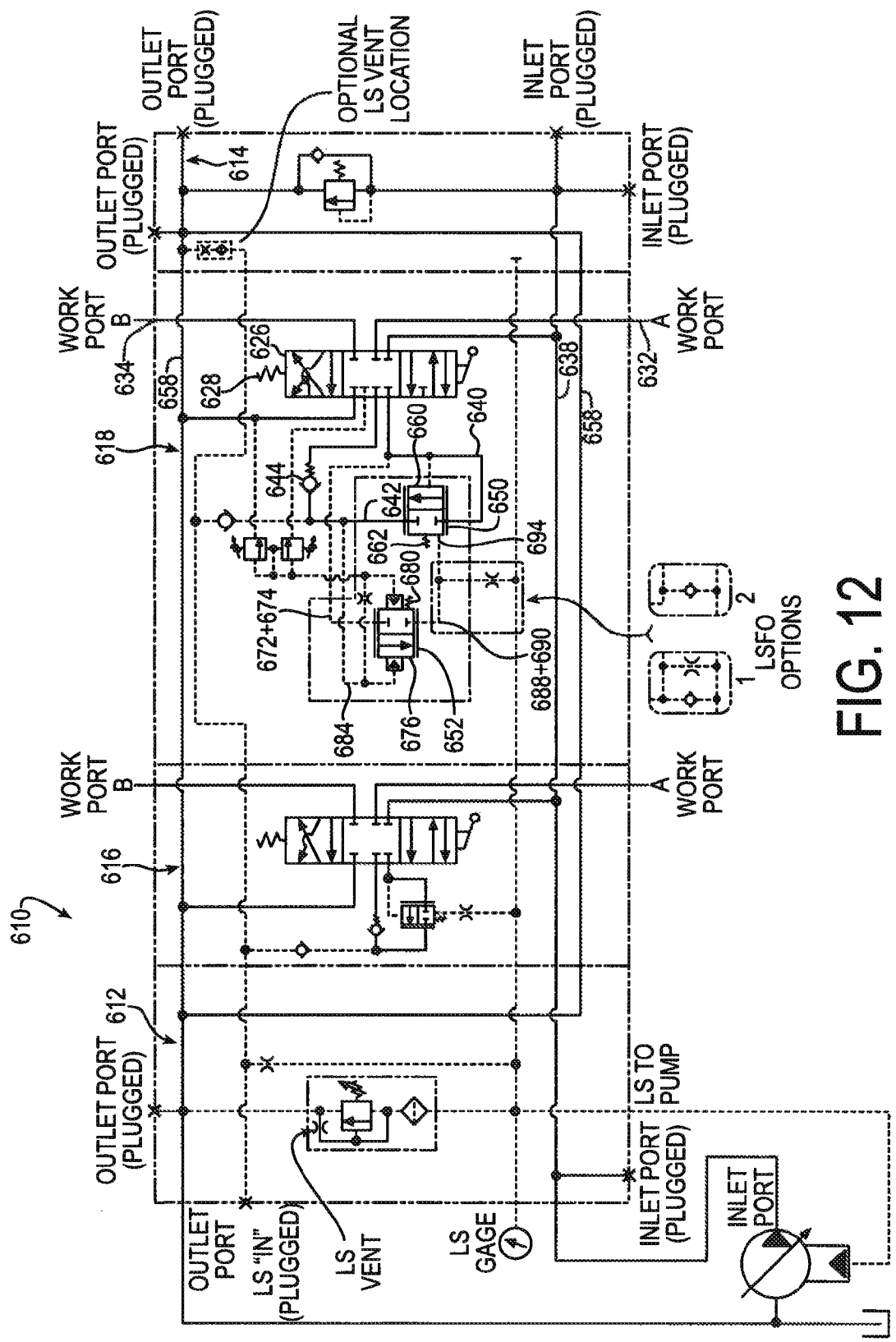
FIG. 12 is a schematic circuit diagram of still another embodiment of the present invention.
Figure 13:
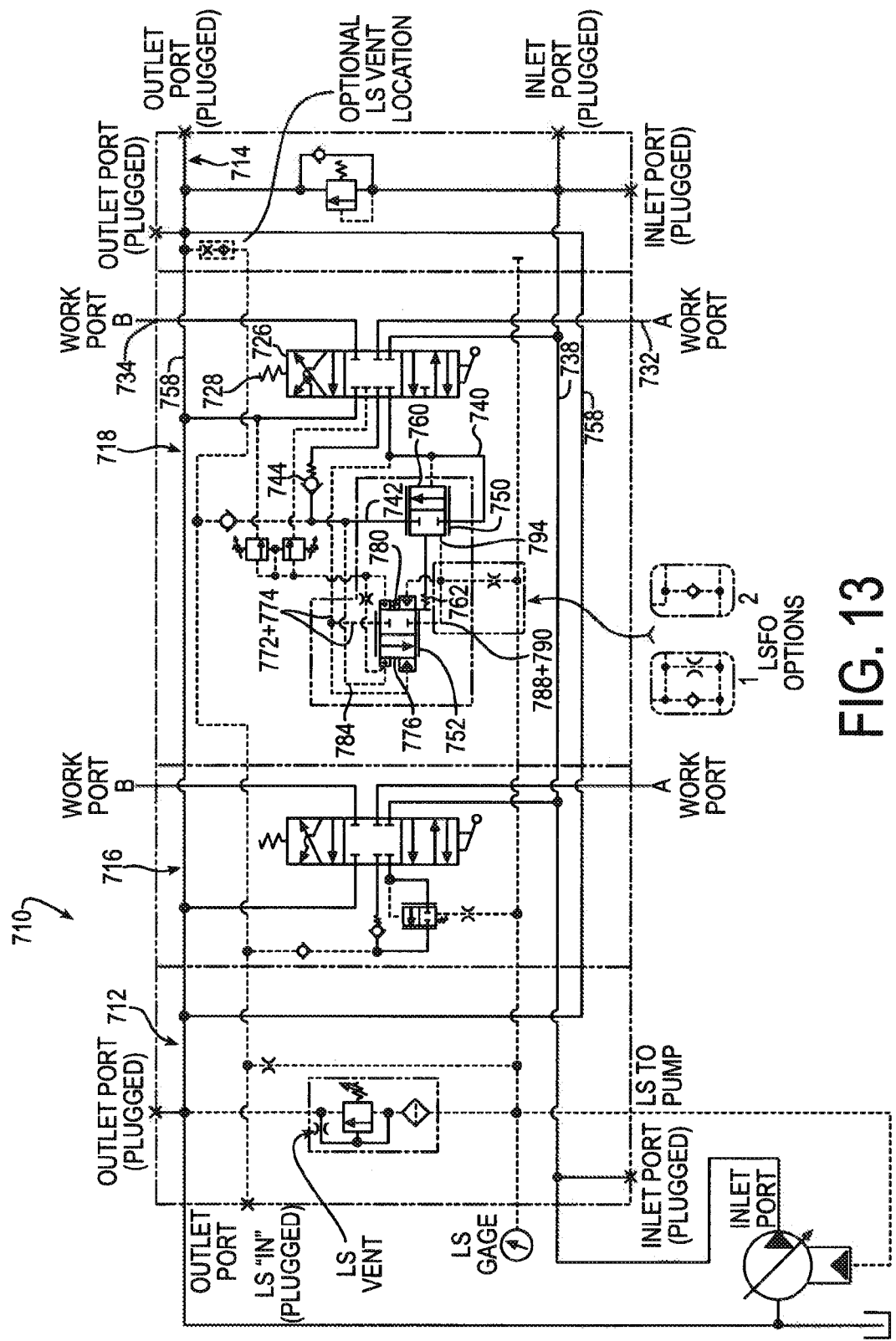
FIG. 13 is a schematic circuit diagram of still another embodiment of the present invention.
Figure 14:
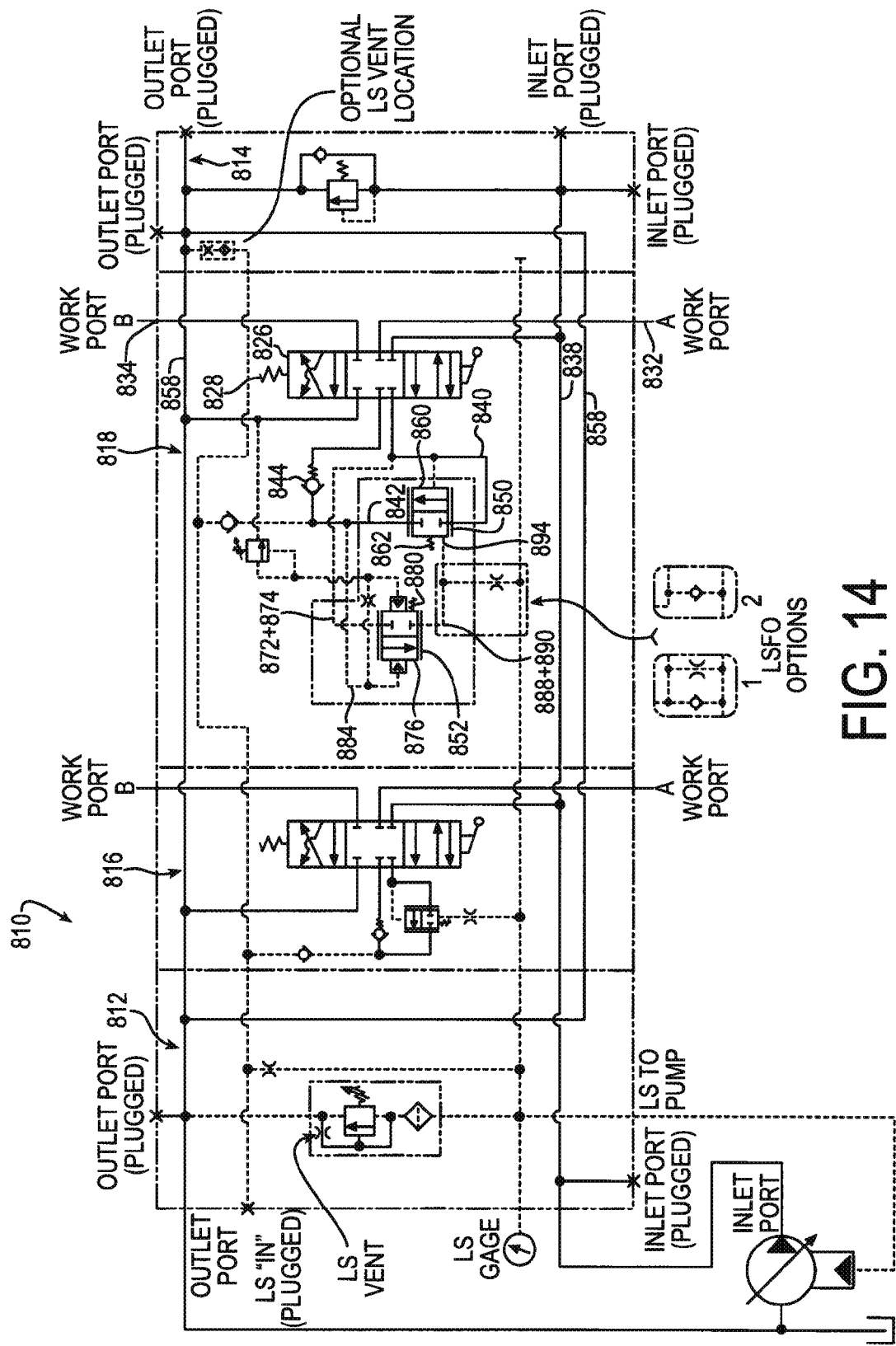
FIG. 14 is a schematic circuit diagram of still another embodiment of the present invention.

FIGS. 7-14 illustrate various schematics of valve section assemblies having at least one working section constructed generally in accordance with the previous description. The reference numbers indicated in FIGS. 7-14 are the same as used in FIGS. 1-6, but with: a prefix 1 added in FIG. 7; a prefix 2 added in FIG. 8; a prefix 3 added in FIG. 9; a prefix 4 added in FIG. 10; a prefix 5 added in FIG. 11; a prefix 6 added in FIG. 12; a prefix 7 added in FIG. 13; a prefix 8 added in FIG. 14. The forces which govern the pressure limiter valves 152, 252, 352, 452, 552, 652, 752 and 852 in the embodiments illustrated in FIGS. 7 to 14 may be different from those of the pressure limiter valve 52 illustrated in FIGS. 1-6. FIGS. 3 and 7 to 11 illustrate working sections having internally adjustable type pressure settings for the respective pressure limiter valves that are applicable for both working ports A and B of the applicable working section. Thus, in FIGS. 7 to 11 the pressure regulated to both the working port A and working port B of the working section having the pressure limiter valves 152, 252, 352, 452 and 552 are controlled to the same maximum pressure setting. In FIGS. 12 and 13, the pressure setting for work port A and the pressure setting for work port B may be set to levels that are different from one another. In FIGS. 12 and 13 these pressure settings are also externally adjustable outside of the valve housing 24 by controlling a function outside of the valve assembly. In FIG. 14 a single pressure setting is used for both work ports A and B, however in FIG. 14 the pressure setting is adjustable externally to the valve housing 24.

Figure 15:
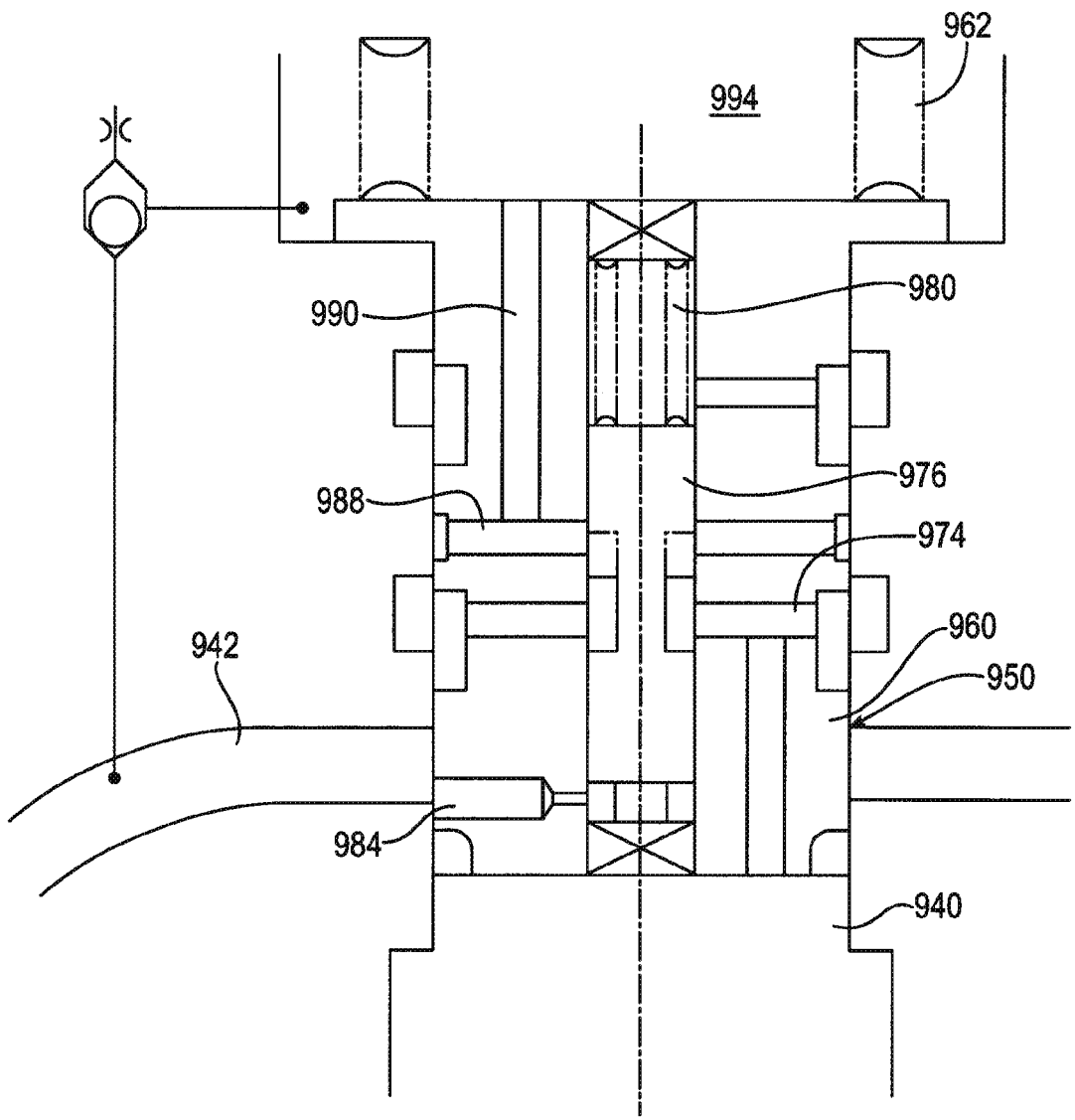
FIG. 15 is a view similar to FIG. 6, showing still another embodiment of the pressure compensator and pressure limiter of the present invention in a closed position.

FIG. 15 illustrates an alternative embodiment of the integral pressure compensator valve 50 and pressure limiter valve 52 of the main control valve combination or working section 18 shown in FIGS. 1 to 6. In the embodiment shown in FIG. 15, an alternative integral pressure compensator valve 950 and pressure limiter valve 952 are shown. The valves 950 and 952 may be used in the valve section assembly 10 shown in FIGS. 1 to 6. The valves 950 and 952 are structurally and functionally similar to the valves 50 and 52 with a prefix 9 added, except as otherwise noted.

Referring specifically to FIG. 15, the pressure limiter valve 952 includes a pressure limiter flow control passage 972 which is in fluid communication with the center spool gallery 40 and a pressure limiter control spool 976. The pressure compensator valve 950 includes a pressure compensator spool 960 that is biased in an opening direction from the closed position shown in FIG. 15 by fluid pressure in the spool gallery 940. The pressure compensator spool 960 is, in a known manner, biased in the opposite direction to its closed position by a combination of a load sense pressure in load sense chamber 994 and a force of a compensator spring 962. The compensator spring 962 applies its biasing force against the spool 960 in a closing direction. The load sense pressure in the chamber 994 is the highest work port pressure in any work port of the unitary valve section assembly 10. The load sense pressure is also the pressure that is fed back to the pump (or pressure source) 20 for establishing the pump margin pressure. A pressure limiter control spool 976 is biased into a first or closed position, as is illustrated in FIG. 15, by a predetermined force, such as, for example, a spring force from a pressure limiter control spring 980. A pressure limiter flow control passage 972 is formed within the compensator spool 960 and communicates with an exterior annular groove located in a pressure limiter control spool 976. In response to fluid pressure in the work port (or intermediate flow passage) entering passage 984 and acting on an end of the pressure limiter spool 976 opposite the regulator spring 980, the pressure limiter spool 976 moves upwardly, as viewed in FIG. 15 relative to the compensator spool 960 and against the bias of the regulator spring 980. The pressure limiter spool 976 includes an annular groove that, when the pressure limiter spool 976 has moved a sufficient distance relative to the compensator spool 960 (as shown by dashed lines in FIG. 15), connects the fluid pressure received in passage 974 through various other passages 988 to a chamber 994 located at an end of the compensator spool 60 for biasing the compensator spool 960 toward its closed position. In this condition of the pressure limiter spool 976, the fluid pressure acting on each end of the compensator spool 60 is equal to (or at least approximately equal to) the fluid pressure in the center spool gallery 40 acting on the opposite end of the compensator spool 60. When this occurs, the compensator spring 962 acts to close the compensator spool 960 to limit flow from the center spool gallery 40 to the intermediate feed passage 42. In this manner, the pressure limiter 52 may provide fluid pressure from the center spool gallery 40 to the chamber 994 at the second end of the compensator spool 960 when the pressure in the intermediate feed passage 42 reaches a predetermined pressure, thus limiting the pressure in the intermediate feed passage 42 to that predetermined pressure. For example in FIG. 15, the pressure limiter spring 980 may be set to limit the fluid pressure in an intermediate feed passage 42 to 1,500 psi.

Figure 16:
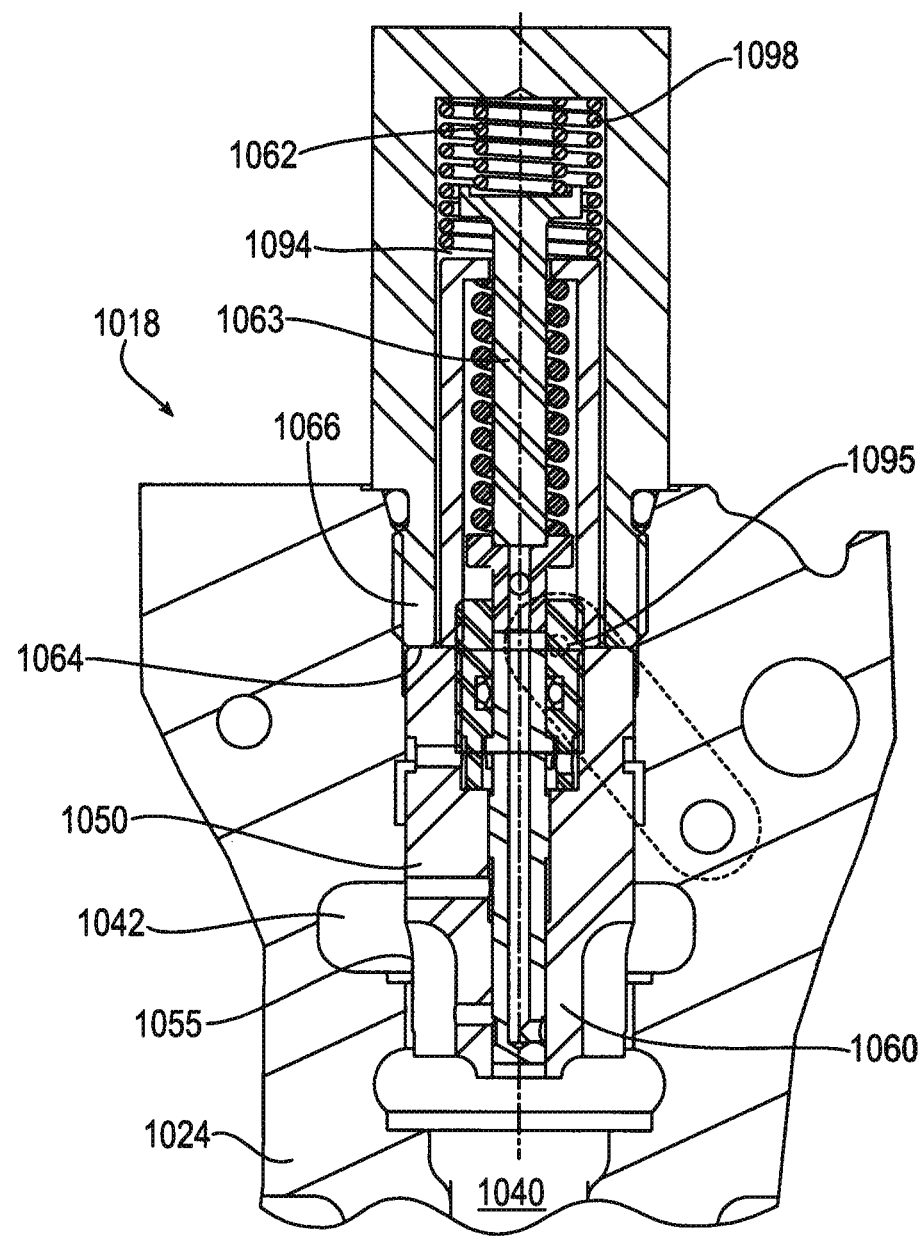
FIG. 16 is a view similar to FIG. 5, showing still another embodiment of the pressure compensator and pressure limiter of the present invention in an opened position.
Figure 17:
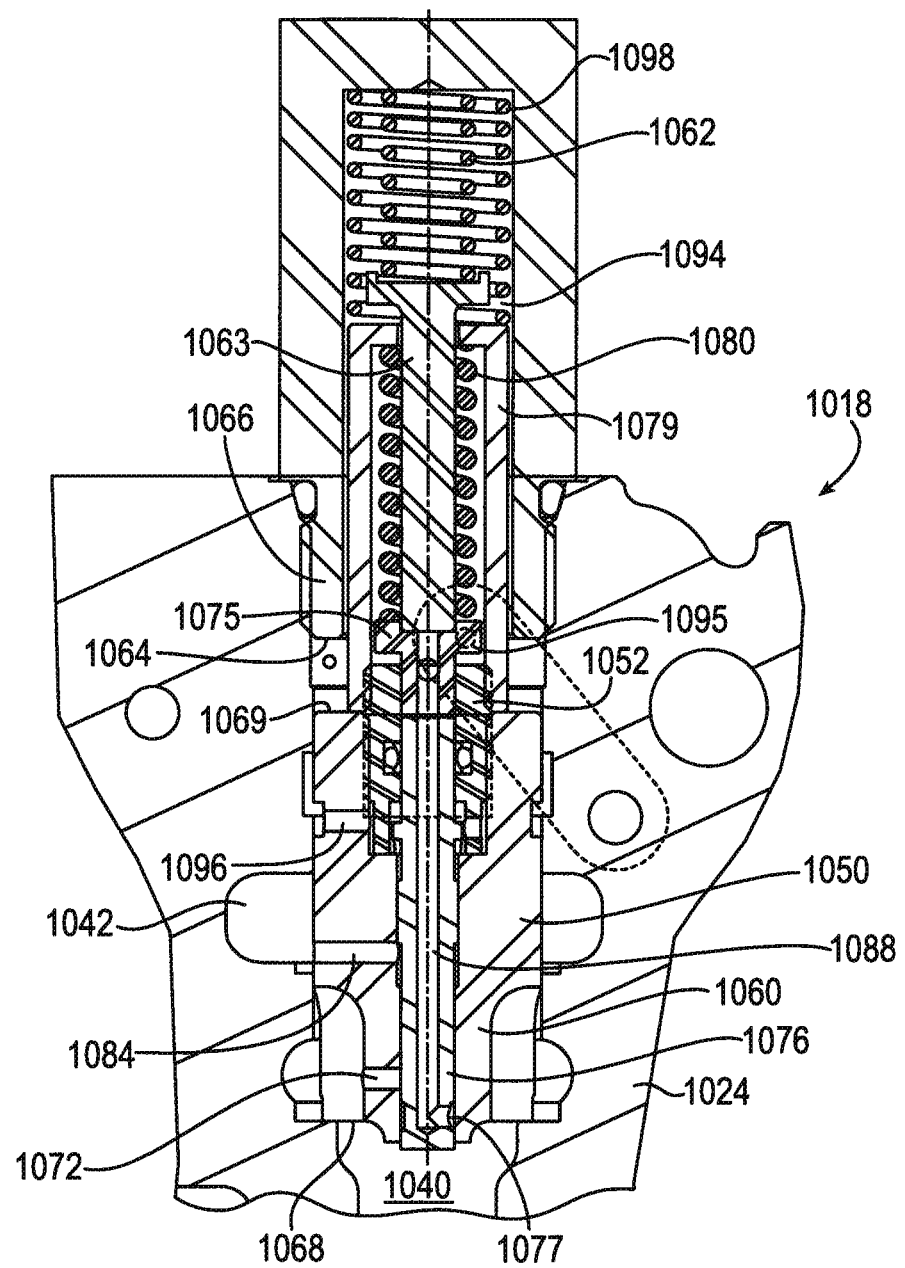
FIG. 17 is a view similar to FIG. 6, showing the FIG. 16 embodiment of the pressure compensator and pressure limiter of the present invention in a closed position.

FIGS. 16 and 17 illustrates an alternative embodiment of the integral pressure compensator valve 50 and pressure limiter valve 52 of the main control valve combination or working section 18 shown in FIGS. 1 to 6. In the embodiment shown in FIGS. 16 and 17, an alternative integral pressure compensator valve 1050 and pressure limiter valve 1052 are shown. The valves 1050 and 1052 may be used in the valve section assembly 10 shown in FIGS. 1 to 6. The valves 1050 and 1052 are structurally and functionally similar to the valves 50 and 52, with a prefix 9 added, except as otherwise noted. A supplemental compensator spring 1098 is arranged coaxially with compensator spring 1062. Compensator spring 1062 acts against force transfer spool 1063, in a similar manner to that shown in FIGS. 1 to 6. Supplemental compensator spring 1098 acts between plug 1066 and retainer 1079, to assist in balancing compensator valve 1050 in the positions shown in FIGS. 16 and 17. The coaxial combination of springs 1098 and 1062 would be used to assist in keeping the pressure limiter differential area D2 minus D1 and the overall design small when a higher force compensator spring and a lower pressure limiter setting are required. Both spring 1098 and spring 1062 will provide the compensator spring function. Spring 1098 in FIGS. 16 and 17 provides a portion of the force resistance that is provided by spring 62 in FIG. 6. The reduced resistance of spring 1062 is compatible with the hydraulic link of compensator valve 50 and pressure limiter spool 76 and with the pressure limiter force balance in this compensator spring force and pressure limiter setting condition.

In the course of describing the embodiments of this invention illustrated in the drawings, various terms have been described above. For convenience, these terms are repeated here. The terms restrict or close include partially and fully close, and the term open includes partially and fully open. The term main flow control valve means a fluid valve located in a fluid flow path and being responsive to an input command. The term pressure compensator valve means a fluid valve, located in a fluid flow path, having a valve spool having cross sectional areas exposed to fluid pressure at different locations in the fluid flow path, and arranged to maintain a predetermined pressure differential. The term pressure limiter valve means a fluid valve, located in a fluid flow path, and having a valve spool having a closing radial (cross sectional) surface area exposed to fluid pressure in at least one location in the fluid flow path and arranged to close flow through the fluid flow path when a set pressure is reached at that location. The term main flow control valve combination means a main flow control valve and its associated fluid controls (for example, an associated pressure compensator valve). The term working section means a unitary valve housing incorporating a main control valve and various other valves of a main flow control valve combination. The term assembly of valve sections means at least one working section combined with other sections (for example, other working sections and/or an inlet section or an outlet section). The term deadheading means an operating condition in which a working section or main flow control valve combination is provided with fluid pressure from a pressure source but with substantially no flow through the main flow control valve variable orifice. The term pressure compensated working section means a working section that includes a pressure compensator valve arranged to maintain a substantially predetermined pressure drop across a variable orifice under normal operating flow conditions independently of the inlet or outlet pressure. The term unitary means of a single piece construction or of a multi-piece construction assembled such that the multiple pieces function as a single piece without external fluid hoses or other external fluid pressure lines. The term integral means two or more functionally different cooperating devices that are assembled without externally exposed fluid connections and used as a whole such that at least one of the devices is an essential part to complete the other.

Presently preferred embodiments of the invention are shown in the drawings and described in detail above. The invention is not, however, limited to these specific embodiments. Various changes and modifications to this invention will be perceived by those skilled in the art. These changes and modifications to this invention can be made without departing from its teachings, and the scope of this invention is defined by the claims set out below.

What is claimed is:

1. An integral pressure compensator valve and pressure limiter valve comprising:
   a fluid flow path;
   a pressure compensator valve and a pressure limiter valve disposed in said fluid flow path and dividing said fluid flow path into an upstream side and a downstream side;
   a pressure compensator spool carrying a pressure compensator valve surface, said pressure compensator valve surface being movable with said pressure compensator spool and defining a variable area fluid orifice in said fluid flow path;
   a pressure limiter spool carrying a pressure limiter valve surface, a pressure limiter passage, said pressure limiter valve surface being movable longitudinally with said pressure limiter spool to open and close said pressure limiter passage, and
   a housing for the fluid flow path, the pressure compensator valve and the pressure limiter valve, the housing having a first spool bore and the pressure compensator spool and the pressure limiter spool are disposed in the first spool bore,
   wherein the pressure compensator spool includes a second spool bore, and the pressure limiter spool is slidably disposed in the second spool bore and is carried by the pressure compensator spool.

2. An integral pressure compensator valve and pressure limiter valve as set forth in claim 1, wherein said pressure compensator valve and said pressure limiter valve are coaxially disposed in said first spool bore.

3. An integral pressure compensator valve and pressure limiter valve as set forth in claim 1, wherein, said housing is one valve section of an assembly of valve sections in which each said valve section includes a main flow control valve and a work port, and each said main flow control valve is a directional control valve.

4. An integral pressure compensator valve and pressure limiter valve as set forth in claim 3, wherein said housing of said one valve section includes a load sense passage.

5. An integral pressure compensator valve and pressure limiter valve as set forth in claim 4, wherein said main flow control valve is in said upstream side of said one valve section.

6. An integral pressure compensator valve and pressure limiter valve as set forth in claim 5, wherein said load sense passage hydraulically connects said compensator spool with the highest pressure level in all of said work port.

7. An integral pressure compensator valve and pressure limiter valve as set forth in claim 1, wherein said pressure compensator spool has at least one radial closing surface area exposed to fluid pressure at a location on said downstream side to urge said pressure compensator spool and said pressure compensator valve surface toward closed positions to close said orifice,
   said pressure compensator spool has at least one opening radial surface area exposed to fluid pressure at a location in said upstream side to urge said pressure compensator spool and said pressure compensator valve surface toward opened positions to open said variable orifice,
   said pressure limiter passage establishes fluid pressure communication between a location in said fluid flow path and at least one said pressure compensator spool closing radial surface area, and
   said pressure limiter spool has at least one opening radial surface area exposed to a limit fluid pressure to urge said pressure limiter spool and said pressure limiter valve surface toward their said opened positions to open said pressure limiter passage when said limit fluid pressure reaches a selected pressure level.

8. An integral pressure compensator valve and pressure limiter valve as set forth in claim 7, including a first biasing device acting against said pressure compensator spool and biasing said pressure compensator spool and said pressure compensator valve surface toward their said closed positions, and a second biasing device acting against said pressure limiter spool and biasing said pressure limiter spool and said pressure limiter valve surface toward their said closed positions.

9. An integral pressure compensator valve and pressure limiter valve as set forth in claim 1, wherein said pressure compensator spool and said pressure limiter spool are disposed in a spool bore opening into said center spool gallery, and said pressure compensator valve surface and said pressure limiter valve surface are each exposed to fluid pressure in said center spool gallery.

10. An integral pressure compensator valve and pressure limiter valve as set forth in claim 1, wherein said pressure compensator valve includes a pressure compensator valve spring biasing said pressure compensator valve spool toward its said closed position and said pressure limiter valve includes a pressure limiter valve spring biasing said pressure limiter valve spool toward its said at rest position.

11. An integral pressure compensator valve and pressure limiter valve as set forth in claim 10, wherein said pressure limiter spring acts between said pressure compensator spool and said pressure limiter spool.

12. An integral pressure compensator valve and pressure limiter valve as set forth in claim 1, including a force transmitting spool, said force transmitting spool extending from said pressure compensator valve spring, through said pressure limiter valve spring, to said pressure limiter valve spool.

13. A working section for a valve assembly comprising:
a valve body having an inlet core, a spool gallery with a reduced fluid pressure that is less than the fluid pressure of the inlet core, and at least one work port;
a spool extending through at least a portion of the valve body and being movable relative to the valve body for controlling fluid flow from the inlet core to the spool gallery;
a compensator valve having a compensator spool separating the spool gallery and the at least one work port, the compensator valve being biased into a closed position and opening for regulating flow between the spool gallery and the at least one work port; and
a pressure limiter for limiting the pressure provided to the work port to a predetermined value, the pressure limiter operable to move the compensator valve toward the closed position when the work port pressure meets or exceeds the predetermined value by connecting fluid passages to direct the reduced fluid pressure from the spool gallery to an opposite end of the compensator spool.

14. The working section of claim 13 wherein a load sense pressure and a compensator spring act to bias the compensator valve toward the closed position, pressure in the spool gallery moving the compensator valve to the open position, the pressure limiter, in response to the work port pressure reaching the predetermined pressure, increasing the fluid pressure acting to bias the compensator valve toward the closed position to a value approximately equal to fluid pressure in the spool gallery.

15. The working section of claim 13 wherein the pressure limiter is integral with the compensator valve.

16. The working section of claim 15 wherein the compensator valve includes a spool, the pressure limiter including a limiter spool that is located in the compensator and is movable relative to the compensator spool in response to pressure in the work port.

17. The working section of claim 16 wherein the compensator spool includes the plurality of fluid passage.

18. The working section of claim 13 wherein the opposite end of the compensator spool is always fluidly connected to a load sense pressure.

19. An integral pressure compensator valve and pressure limiter valve comprising:
a fluid flow path;
a pressure compensator valve and a pressure limiter valve disposed in said fluid flow path and dividing said fluid flow path into an upstream side and a downstream side;
a pressure compensator spool carrying a pressure compensator valve surface, said pressure compensator valve surface being movable with said pressure compensator spool and defining a variable area fluid orifice in said fluid flow path; and
a pressure limiter spool carrying a pressure limiter valve surface, a pressure limiter passage, said pressure limiter valve surface being movable with said pressure limiter spool to open and close said pressure limiter passage when a limit fluid pressure in the downstream side of the fluid flow path reaches a selected pressure level,
said pressure compensator valve surface exposed to said upstream side to urge said pressure compensator spool toward an opened position to open said variable orifice,
said pressure limiter passage establishes fluid pressure communication between the upstream side of said fluid flow path and at least one pressure compensator spool closing radial surface area for urging said pressure compensator spool closed when said limit fluid pressure reaches a selected pressure level.

20. An integral pressure compensator valve and pressure limiter valve as set forth in claim 19, including a first biasing device acting against said pressure compensator spool and biasing said pressure compensator spool and said pressure compensator valve surface toward their said closed positions, and a second biasing device acting against said pressure limiter spool and biasing said pressure limiter spool and said pressure limiter valve surface toward their said closed positions.

21. An integral pressure compensator valve and pressure limiter valve as set forth in claim 19, including
a control chamber exposed to fluid pressure at a location in said downstream side; and
a load sense passage connected to said control chamber,
wherein at least one said pressure compensator radial closing surface area is exposed to fluid pressure in said control chamber to urge said pressure compensator spool and said pressure compensator valve surface toward their said closed positions to close said variable orifice, and
wherein said pressure limiter passage establishes fluid pressure communication between said control chamber and a location in said upstream side of said fluid flow path, said housing includes a center spool gallery disposed in said fluid flow path between said main control spool and said integral pressure compensator valve and pressure limiter valve.

* * * * *